(12) United States Patent
Itoh

(10) Patent No.: US 6,233,099 B1
(45) Date of Patent: May 15, 2001

(54) ZOOM LENS AND OPTICAL APPARATUS HAVING THE SAME

(75) Inventor: Yoshinori Itoh, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/585,604

(22) Filed: Jun. 2, 2000

Related U.S. Application Data

(62) Division of application No. 09/145,241, filed on Sep. 10, 1998.

(30) Foreign Application Priority Data

Sep. 4, 1997 (JP) .................................................. 9-255978
Sep. 11, 1997 (JP) .................................................. 9-264921
Dec. 4, 1997 (JP) .................................................. 9-350079

(51) Int. Cl.$^7$ .................................................. G02B 15/14

(52) U.S. Cl. .......................... 359/686; 359/781; 359/680; 359/715

(58) Field of Search .................................. 359/686, 781, 359/715, 680

(56) References Cited

U.S. PATENT DOCUMENTS

| | | | | |
|---|---|---|---|---|
| 3,771,853 | * | 11/1973 | Nakamura | 359/686 |
| 4,516,839 | * | 5/1985 | Tokumaru | 359/686 |
| 4,687,302 | * | 8/1987 | Ikemori et al. | 359/686 |
| 4,735,493 | | 4/1988 | Tachihara | 359/689 |
| 5,055,868 | | 10/1991 | Itoh et al. | 354/222 |
| 5,078,481 | * | 1/1992 | Nakayama et al. | 359/680 |
| 5,184,251 | | 2/1993 | Tsuchida et al. | 359/868 |
| 5,218,478 | | 6/1993 | Itoh | 359/692 |
| 5,264,965 | * | 11/1993 | Hirakawa | 359/686 |
| 5,274,504 | | 12/1993 | Otoh | 359/676 |
| 5,276,553 | * | 1/1994 | Tatsuno | 359/686 |
| 5,305,148 | | 4/1994 | Ikemori et al. | 359/689 |
| 5,315,441 | * | 5/1994 | Hori et al. | 359/781 |
| 5,329,401 | * | 7/1994 | Sato | 359/686 |
| 5,365,376 | | 11/1994 | Itoh | 359/686 |
| 5,434,710 | | 7/1995 | Zozawa | 359/689 |

(List continued on next page.)

FOREIGN PATENT DOCUMENTS

| | | | |
|---|---|---|---|
| 49-23912 | | 6/1974 | (JP) . |
| 57-163213 | | 10/1982 | (JP) . |
| 58-4113 | | 1/1983 | (JP) . |
| 58-95315 A | * | 6/1983 | (JP) ........ 359/686 |
| 59-16248 | | 4/1984 | (JP) . |
| 60-31110 | | 2/1985 | (JP) . |
| 1-216310 | | 8/1989 | (JP) . |
| 2-201310 | | 8/1990 | (JP) . |
| 2-296208 | | 12/1990 | (JP) . |
| 4-235514 | | 8/1992 | (JP) . |
| 4-235515 | | 8/1992 | (JP) . |
| 5-19170 | * | 1/1993 | (JP) ........ 359/686 |
| 5-173071 | * | 7/1993 | (JP) ........ 359/686 |
| 53-13066 | | 11/1993 | (JP) . |
| 6-66008 | | 8/1994 | (JP) . |
| 7-52256 | | 6/1995 | (JP) . |
| 8-110470 | | 4/1996 | (JP) . |

Primary Examiner—Georgia Epps
Assistant Examiner—Evelyn A. Lester
(74) Attorney, Agent, or Firm—Fitzpatrick, Cella, Harper & Scinto

(57) ABSTRACT

A zoom lens of the negative lead type includes, in order from the object side, a first lens unit of negative refractive power, a second lens unit of positive refractive power, a third lens unit of negative refractive power consisting of one negative lens, and a fourth lens unit of positive refractive power consisting of one positive lens, wherein, during zooming from the wide-angle end to the telephoto end, all the lens units move along an optical axis in such a manner that the separation between the first lens unit and the second lens unit decreases, the separation between the second lens unit and the third lens unit increases and the separation between the third lens unit and the fourth lens unit decreases.

35 Claims, 30 Drawing Sheets

U.S. PATENT DOCUMENTS

| | | | |
|---|---|---|---|
| 5,574,599 | 11/1996 | Hoshi et al. | 359/689 |
| 5,576,890 * | 11/1996 | Tanaka et al. | 359/686 |
| 5,585,970 * | 12/1996 | Shibayama | 359/686 |
| 5,585,971 | 12/1996 | Otoh | 359/692 |
| 5,587,840 | 12/1996 | Itoh | 359/686 |
| 5,627,681 * | 5/1997 | Tsay | 359/686 |
| 5,663,835 * | 9/1997 | Shibayama | 359/684 |
| 5,666,230 * | 9/1997 | Tatsuno | 359/684 |
| 5,687,027 | 11/1997 | Itoh | 359/692 |
| 5,748,384 * | 5/1998 | Sensui | 359/686 |
| 5,786,942 * | 7/1998 | Komori et al. | 359/686 |
| 5,805,350 * | 9/1998 | Yamamoto | 359/686 |
| 5,815,320 | 9/1998 | Hoshi et al. | 359/686 |
| 5,831,772 | 11/1998 | Nishio et al. | 359/689 |
| 5,844,725 | 12/1998 | Itoh | 359/692 |
| 5,991,093 * | 11/1999 | Murata et al. | 359/686 |
| 5,999,329 * | 12/1999 | Ohtake | 359/686 |
| 6,008,953 | 12/1999 | Itoh | 359/692 |

* cited by examiner

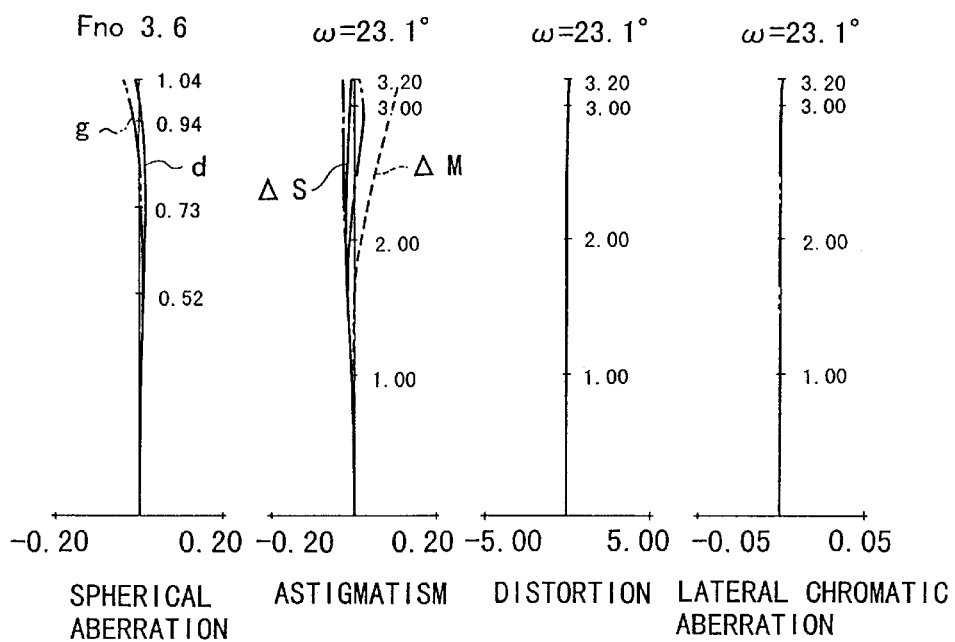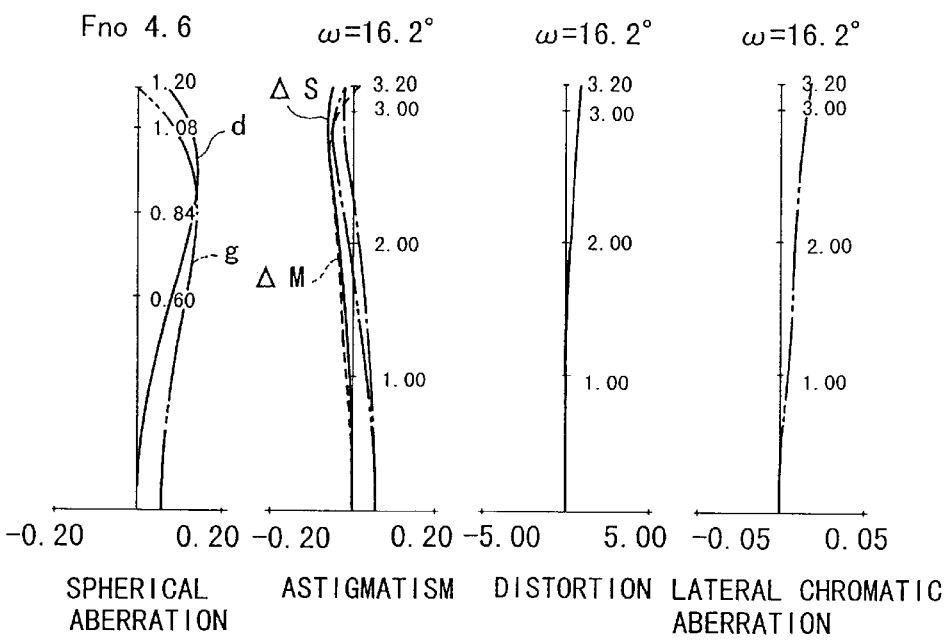

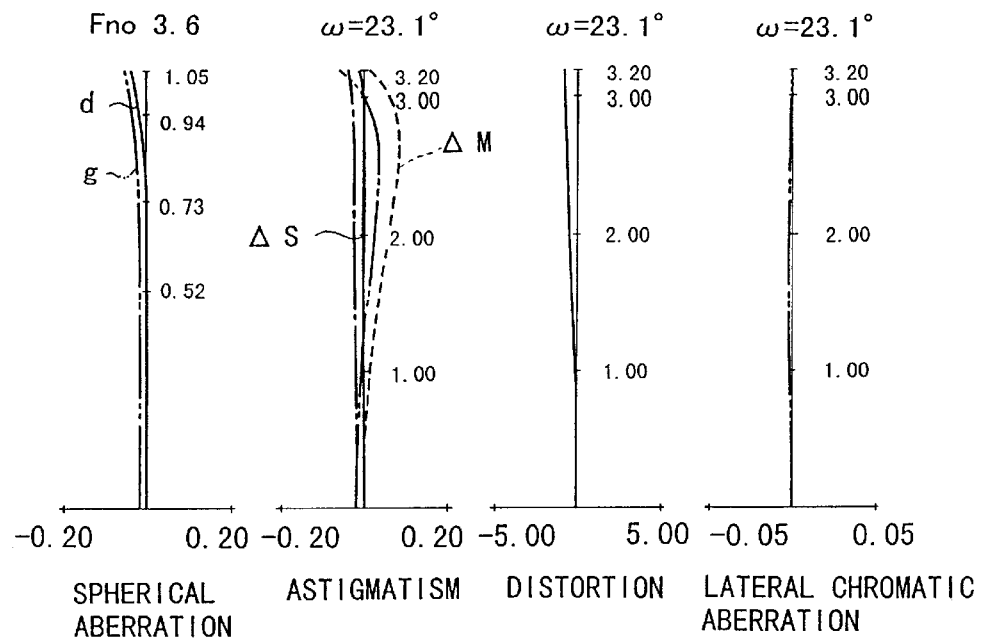
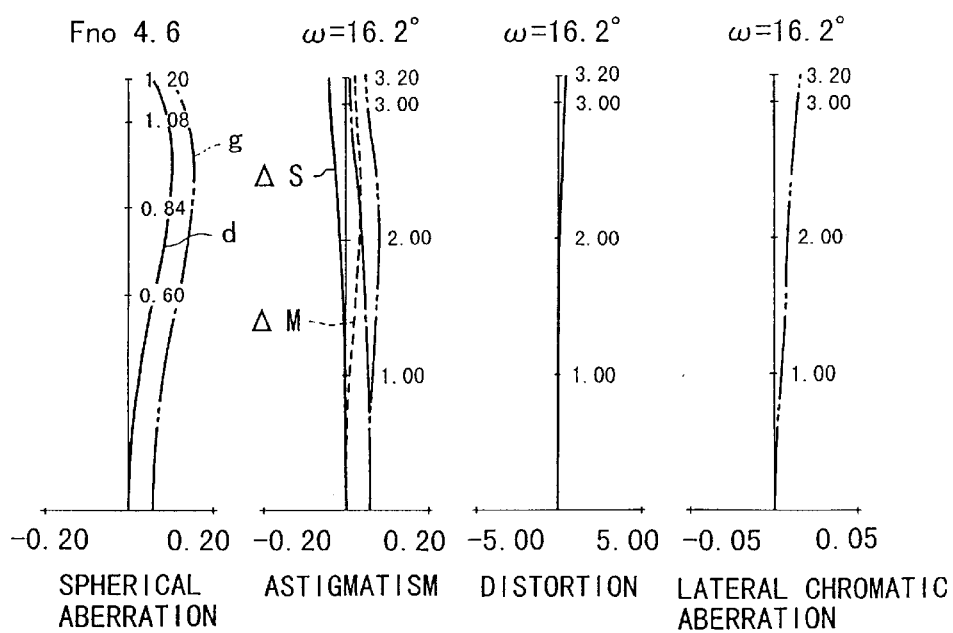

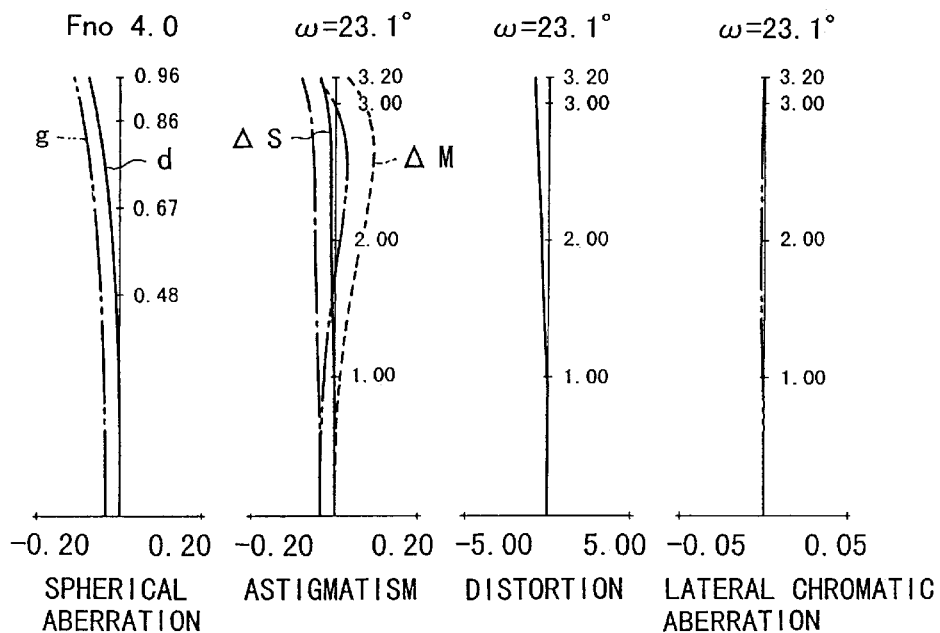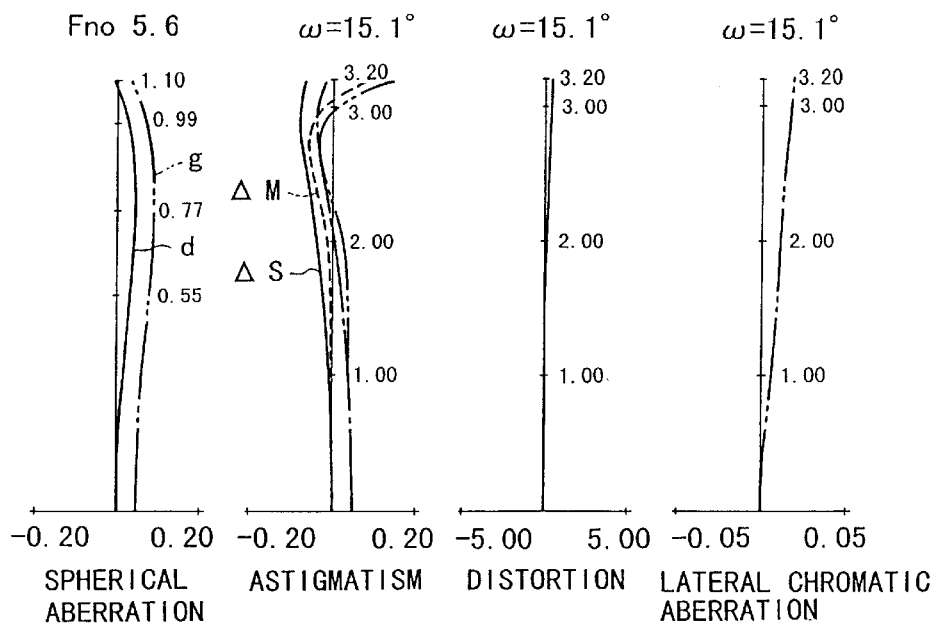

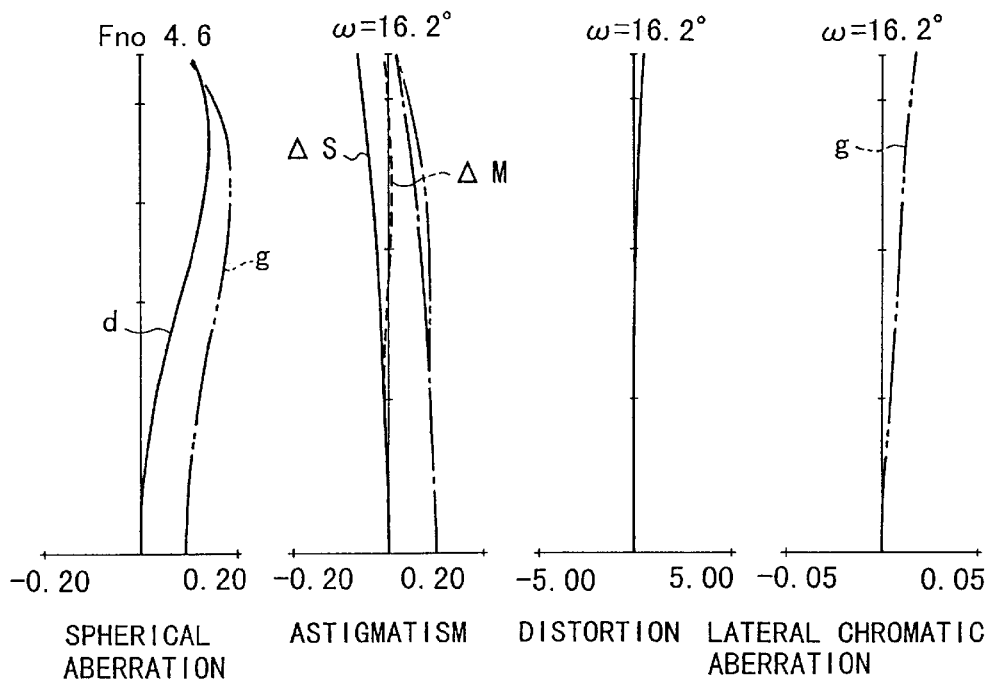
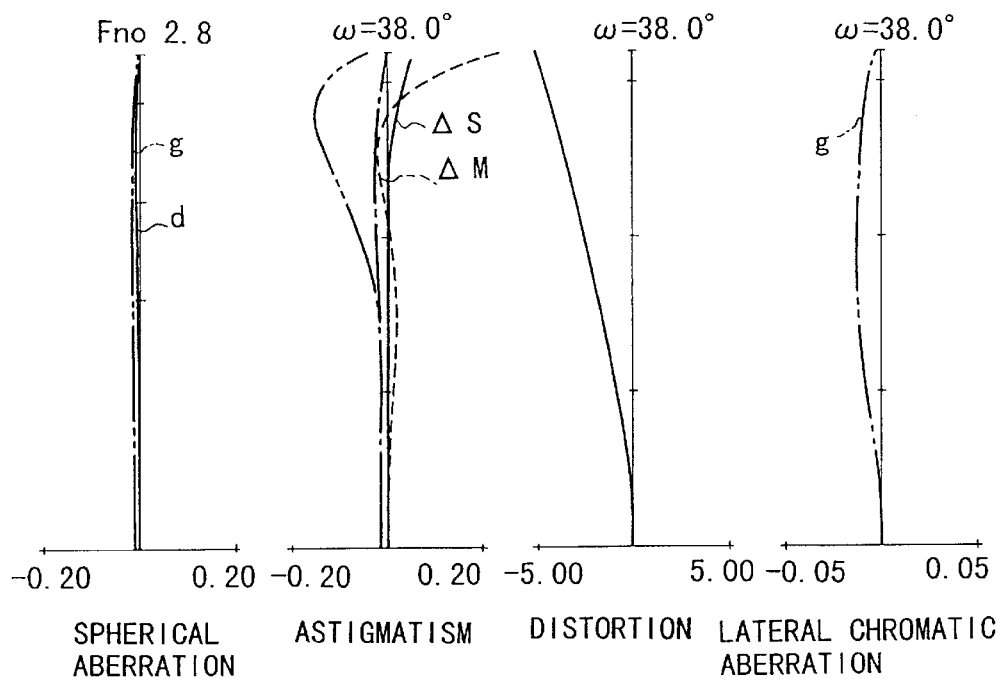

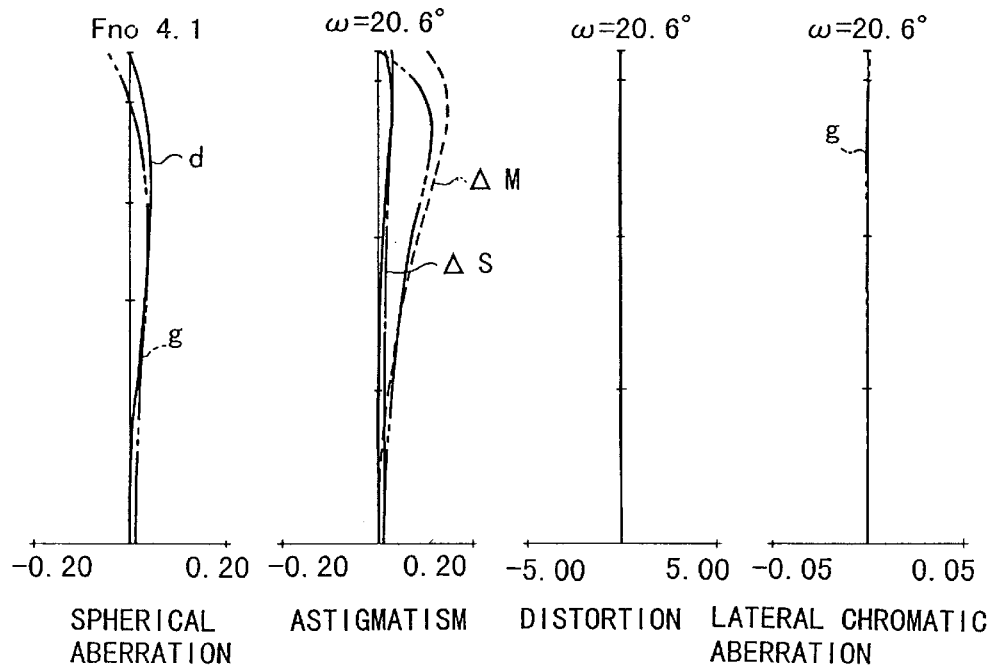
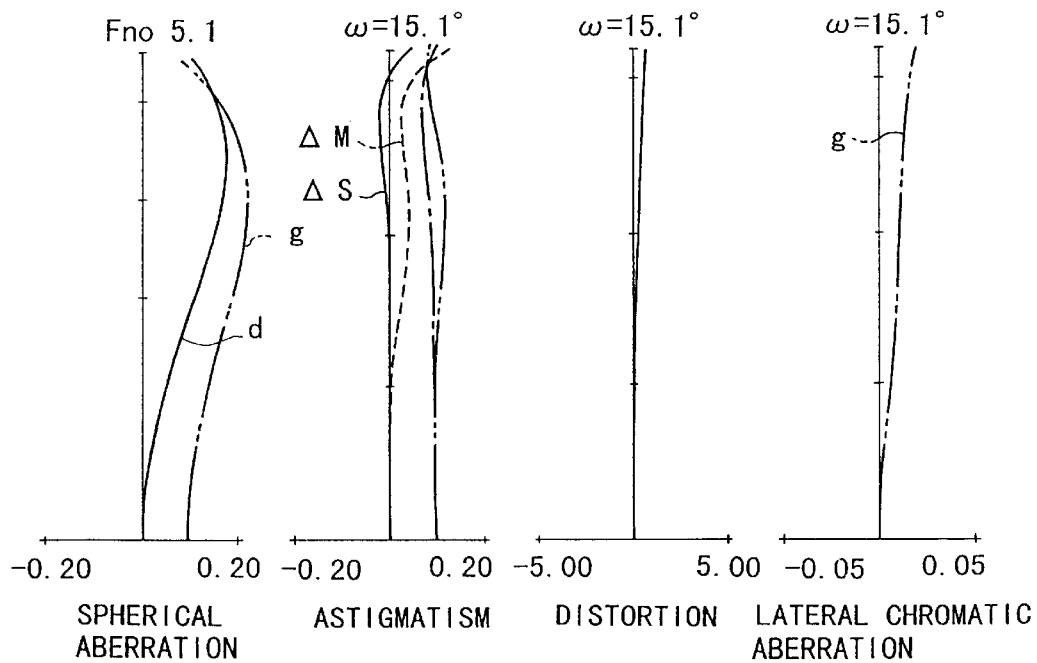

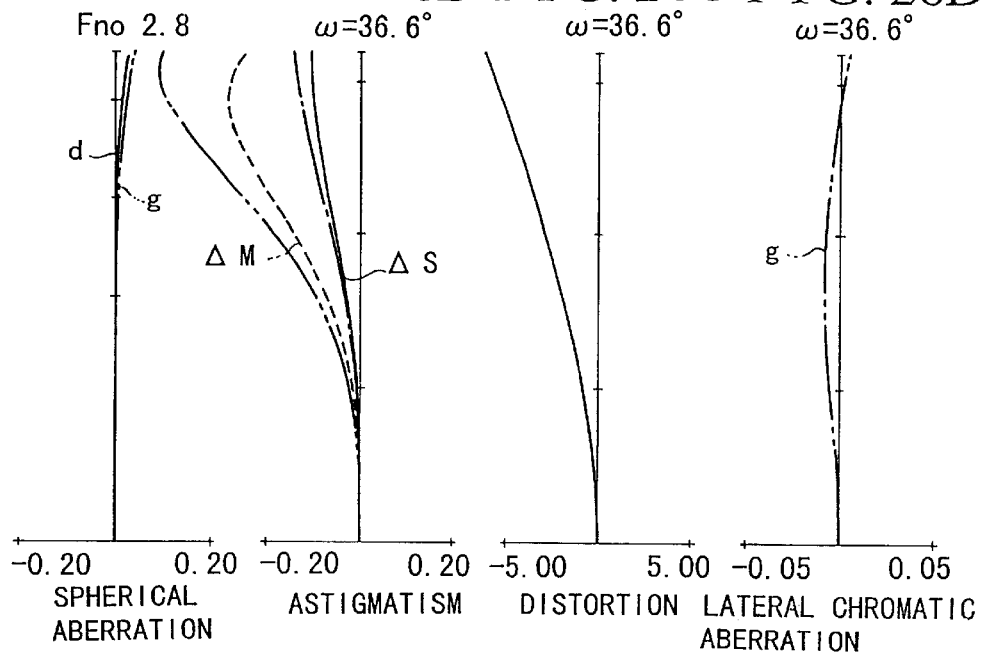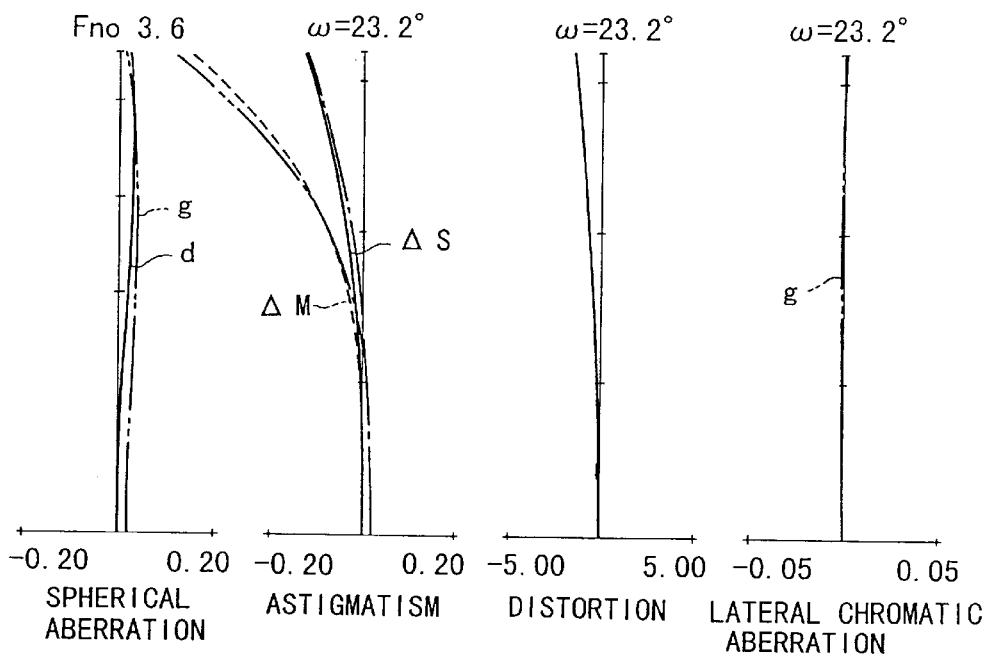

ZOOM LENS AND OPTICAL APPARATUS HAVING THE SAME

This a divisional application of U.S. Patent Appl. Ser. No. 09/145,241, filed Sep. 10, 1998, now allowed.

BACKGROUND OF THE INVENTION

1. Field of the Invention

The present invention relates to compact wide-angle zoom lenses suited to electronic still cameras, lens-shutter cameras, or video cameras and, more particularly, to zoom lenses which have their maximum field angles made wider with a shortening of the total length (the distance from the front vertex to the image plane) for excellent portability and are constructed in a simple form.

2. Description of Related Art

In the field of art of image pickup apparatuses using a CCD or like image pickup element, such as electronic still cameras for shooting still pictures and video cameras for taking motion pictures, the tendency to reduce the camera to ever more compact sizes has prevailed. Along with this tendency, there is a demand for wide-angle zoom lenses of shorter total lengths with the diameter minimized at the maximum angle of field. Of the types of zoom lenses, the one in which the front or first lens unit is of negative refractive power, or the so-called "negative lead" type, is amenable to relatively easy techniques of widening the angle of field. For this reason, the negative lead type has found its use in many wide-angle zoom lenses having a field angle of 70° or wider.

Such an adaptation of zoom lenses to wider angles of field has been proposed in, for example, Japanese Laid-Open Patent Applications No. Hei 2-201310, No. Hei 2-296208, No. Hei 4-235514 and No. Hei 4-235515. The zoom lenses proposed here are constructed, as comprising, in order from the object side, four lens units of negative, positive, negative and positive refractive powers.

Also, in Japanese Patent Publication No. Sho 49-23912 and Japanese Laid-Open Patent Application No. Sho 57-163213, there have been proposed zoom lenses comprising, in order from the object side, a first lens unit of negative refractive power, a second lens unit of positive refractive power, a third lens unit of negative refractive power and a fourth lens unit of positive refractive power, wherein, during zooming from the wide-angle end to the telephoto end, the first lens unit axially moves toward the image side, while simultaneously moving the second and fourth lens units toward the object side. The third lens unit is made either stationary during zooming or movable for zooming.

Also, Japanese Laid-Open Patent Application No. Sho 58-4113 has proposed a zoom lens of widened field angles with four lens units of negative, positive, negative and positive refractive powers in order from the object side, wherein all the air separations are made variable to obtain a zoom ratio of 2.5–3 or thereabout.

Also, Japanese laid-Open Patent Application No. Hei 1-216310 has proposed a zoom lens which comprises four lens units of negative, positive, negative and positive refractive powers in order from the object side, wherein, for a zoom ratio of about 2, the total number of lens elements is relatively small.

Japanese Laid-Open Patent Applications No. Hei 5-313066 and No. Hei 8-110470 have proposed another zoom lens which comprises five lens units of negative, negative, positive, negative and positive refractive powers in order from the object side, wherein all the lens units are made movable for zooming.

Japanese Laid-Open Patent Applications No. Sho 59-16248 and No. Hei 6-66008 have proposed yet another zoom lens comprising, in order from the object side, a first lens unit of negative refractive power and a second lens unit of positive refractive power, totaling two lens units, wherein the separation between both the lens units is made variable for zooming, that is, the so-called "short" zoom lens.

Also, Japanese laid-Open Patent Applications No. Hei 7-52256 has proposed a zoom lens comprising, in order from the object side, a first lens unit of negative refractive power, a second lens unit of positive refractive power and a third lens unit of positive refractive power, wherein zooming from the wide-angle end to the telephoto end is carried out by increasing the separation between the second and third lens units.

U.S. Pat. No. 5,434,710 has proposed a zoom lens comprising, in order from the object side, a first lens unit of negative refractive power, a second lens unit of positive refractive power and a third lens unit of positive refractive power, wherein zooming from the wide-angle end to the telephoto end is carried out by decreasing the separation between the second and third lens units.

Also, Japanese Laid-Open Patent Applications No. Sho 60-31110 has proposed a zoom lens comprising, in order from the object side, a first lens unit of negative refractive power, a second lens unit of positive refractive power, and a third lens unit of positive refractive power and a fourth lens unit of positive refractive power, wherein, during zooming from the wide-angle end to the telephoto end, the fourth lens unit remains stationary, and the separation between the second and third lens units is made to decrease.

In general, the negative lead-type zoom lenses reduce the total number of lens elements in the entire system for the purpose of simplifying the structure of construction. In addition, the maximum field angle is, for example, 70°, the zoom ratio is about 2.5–3, and the F-number for the wide-angle end is about 2.8. With this specification secured, in order to obtain a good optical performance throughout the entire zooming range, a good determination must be made of the refractive power arrangement of all the lens units and the form and the construction of all the constituent lenses. If the rules of design are inappropriate, a large variation of aberrations with zooming results, making it difficult to maintain good stability of high optical performance over the entire zooming range.

BRIEF SUMMARY OF THE INVENTION

The present invention sets forth appropriate rules of design for every lens unit to improve the compact form of the entire lens system, to widen the maximum field angle, and to increase the zoom ratio, while still maintaining good stability of high optical performance throughout the entire zooming range. It is, therefore, an object of the invention to provide a novel form of zoom lens of the negative lead type.

To attain the above object, in accordance with an aspect of the invention, there is provided a zoom lens, which comprises, in order from an object side to an image side, a first lens unit of negative refractive power, a second lens unit of positive refractive power, a third lens unit of negative refractive power, the third lens unit consisting of one negative lens, and a fourth lens unit of positive refractive power, the fourth lens unit consisting of one positive lens, wherein, during zooming from a wide-angle end to a telephoto end, all the lens units move along an optical axis in such a manner that the separation between the first lens unit and the second lens unit decreases, the separation between the second lens unit and the third lens unit increases and the separation between the third lens unit and the fourth lens unit decreases.

In accordance with another aspect of the invention, there is provided a zoom lens, which comprises, in order from an object side to an image side, a first lens unit of negative refractive power, a second lens unit of negative refractive power, a third lens unit of positive refractive power, a fourth lens unit of negative refractive power, the fourth lens unit consisting of one lens, and a fifth lens unit of positive refractive power, wherein, during zooming from a wide-angle end to a telephoto end, all the lens units move along an optical axis in such a manner that the separation between the first lens unit and the second lens unit varies, the separation between the second lens unit and the third lens unit decreases, the separation between the third lens unit and the fourth lens unit increases and the separation between the fourth lens unit and the fifth lens unit decreases.

In accordance with a further aspect of the invention, there is provided a zoom lens, which comprises, in order from an object side to an image side, a first lens unit of negative refractive power, a second lens unit of positive refractive power, and a third lens unit of positive refractive power, the third lens unit consisting of one positive lens, wherein, during zooming from a wide-angle end to a telephoto end, all the lens units move along an optical axis in such a manner that the separation between the first lens unit and the second lens unit decreases and the separation between the second lens unit and the third lens unit decreases.

Theses and further aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 7A to 7D are graphic representations of the aberrations of the numerical example 2 of the zoom lens in a middle focal length position.

FIGS. 8A to 8D are graphic representations of the aberrations of the numerical example 2 of the zoom lens at the telephoto end.

FIGS. 11A to 11D are graphic representations of the aberrations of the numerical example 3 of the zoom lens in a middle focal length position.

FIGS. 12A to 12D are graphic representations of the aberrations of the numerical example 3 of the zoom lens at the telephoto end.

FIGS. 15A to 15D are graphic representations of the aberrations of the numerical example 4 of the zoom lens in a middle focal length position.

FIGS. 16A to 16D are graphic representations of the aberrations of the numerical example 4 of the zoom lens at the telephoto end.

FIGS. 22A to 22D are graphic representations of the aberrations of the numerical example 5 of the zoom lens at the telephoto end.

FIGS. 23A to 23D are graphic representations of the aberrations of the numerical example 6 of the zoom lens at the wide-angle end.

FIGS. 24A to 24D are graphic representations of the aberrations of the numerical example 6 of the zoom lens in a middle focal length position.

FIGS. 25A to 25D are graphic representations of the aberrations of the numerical example 6 of the zoom lens at the telephoto end.

FIGS. 26A to 26D are graphic representations of the aberrations of the numerical example 7 of the zoom lens at the wide-angle end.

FIGS. 27A to 27D are graphic representations of the aberrations of the numerical example 7 of the zoom lens in a middle focal length position.

DETAILED DESCRIPTION OF THE INVENTION

Hereinafter, preferred embodiments of the invention will be described in detail with reference to the drawings.

(First Embodiment)

To begin with, using FIGS. 1A to 1C through FIGS. 16A to 16D, a first embodiment (numerical examples 1 to 4) of the zoom lens of the invention is described.

Figure 1A:
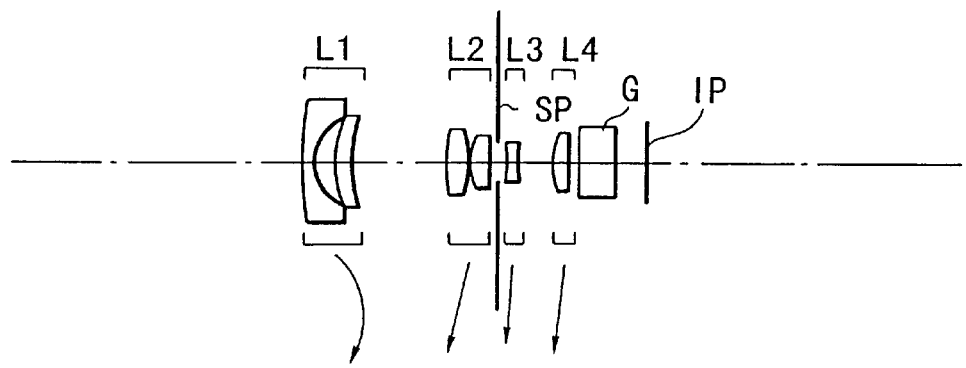
FIGS. 1A to 1C are longitudinal section views of a numerical example 1 of the zoom lens in three operative positions.
Figure 1B:
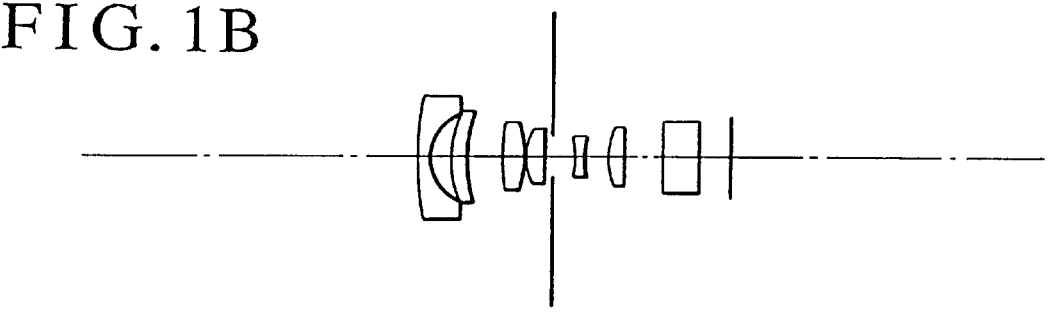
Figure 1C:
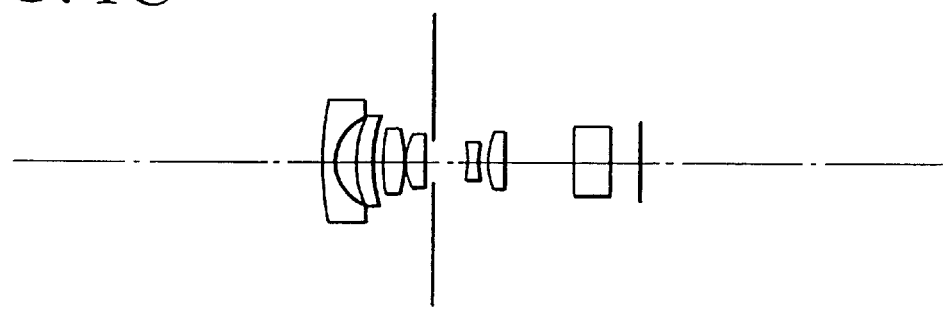
Figures 2A, 2B, 2C, 2D:
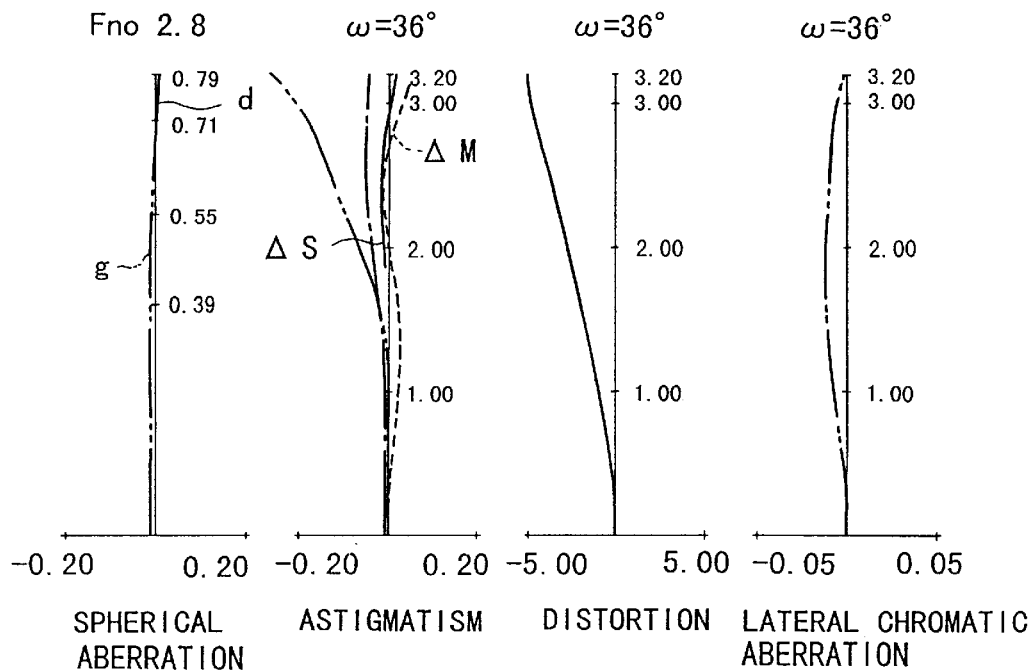
FIGS. 2A to 2D are graphic representations of the aberrations of the numerical example 1 of the zoom lens at the wide-angle end.
Figures 3A, 3B, 3C, 3D:
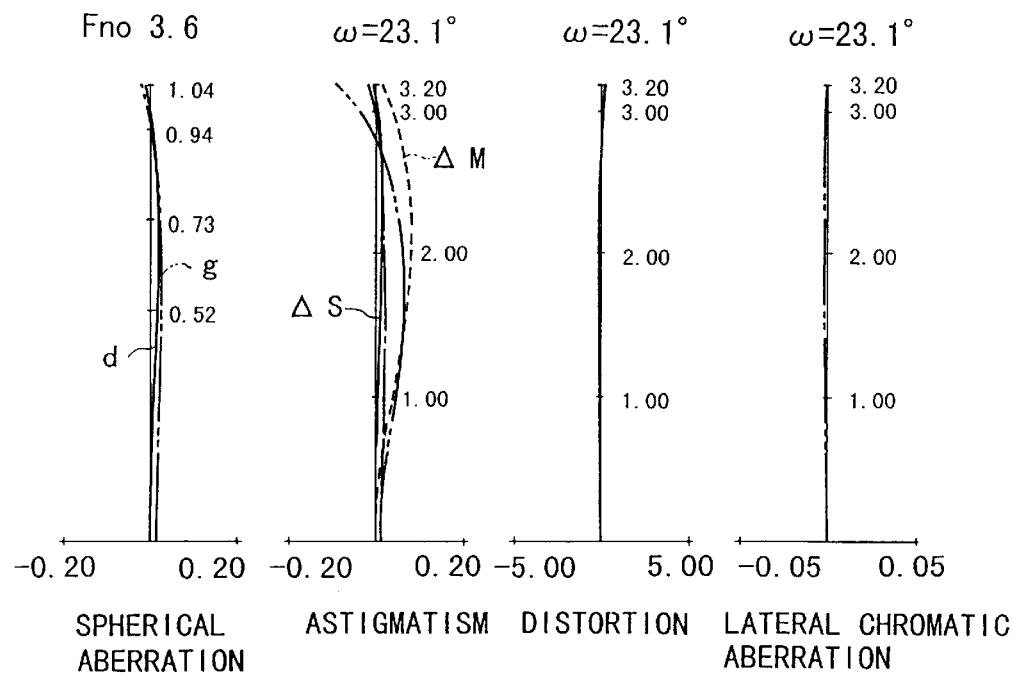
FIGS. 3A to 3D are graphic representations of the aberrations of the numerical example 1 of the zoom lens in a middle focal length position.
Figures 4A, 4B, 4C, 4D:
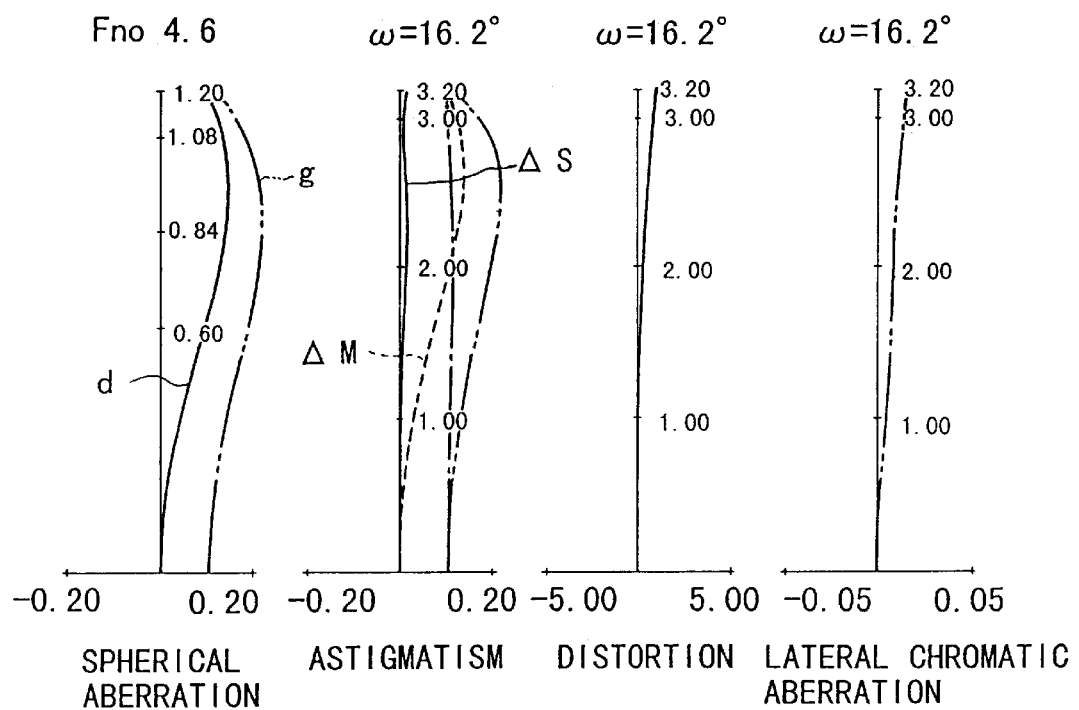
FIGS. 4A to 4D are graphic representations of the aberrations of the numerical example 1 of the zoom lens at the telephoto end.
Figure 5A:
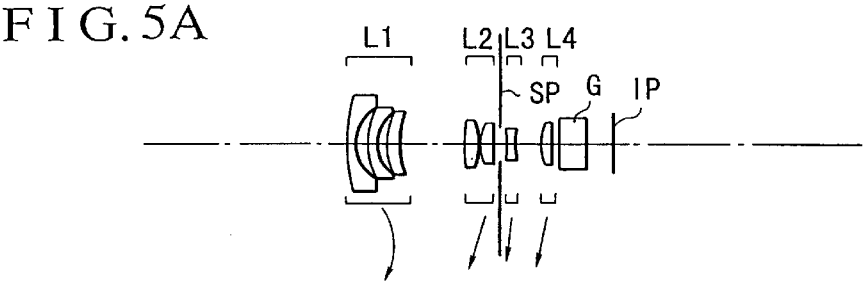
FIGS. 5A to 5C are longitudinal section views of a numerical example 2 of the zoom lens in three operative positions.
Figure 5B:
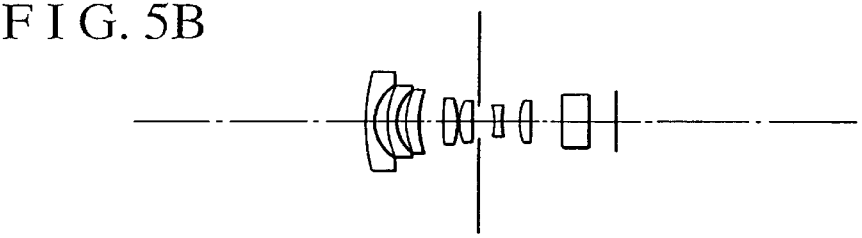
Figure 5C:
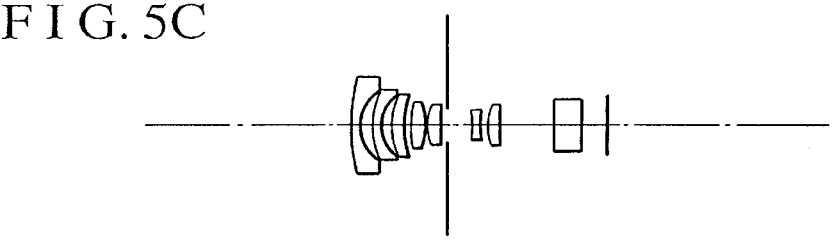
Figures 6A, 6B, 6C, 6D:
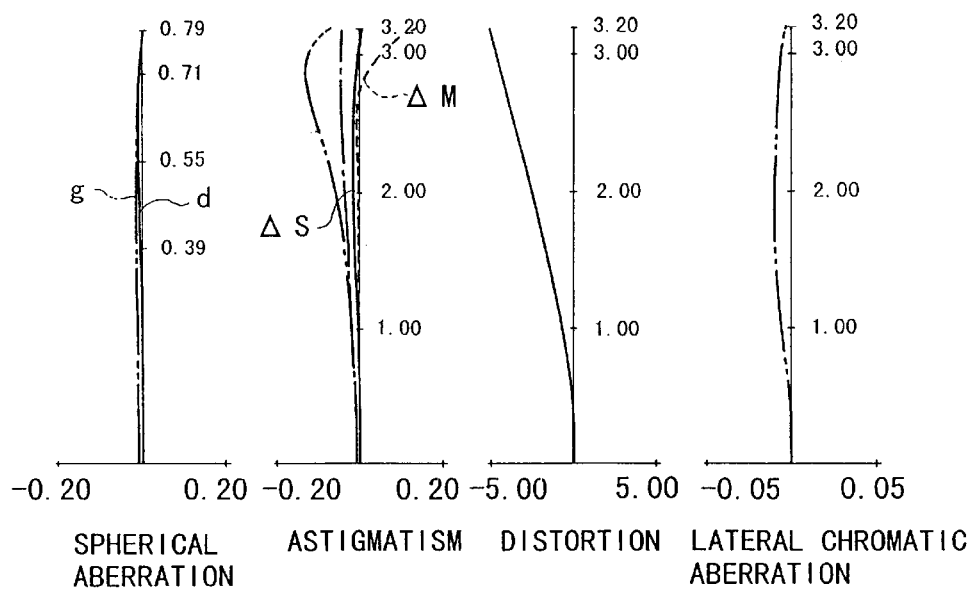
FIGS. 6A to 6D are graphic representations of the aberrations of the numerical example 2 of the zoom lens at the wide-angle end.
Figure 9A:
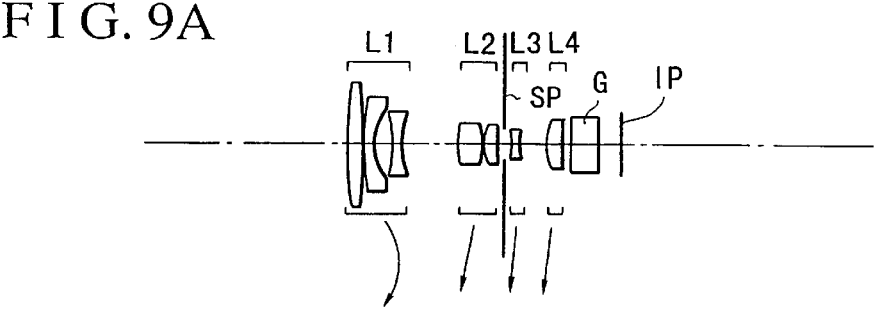
FIGS. 9A to 9C are longitudinal section views of a numerical example 3 of the zoom lens in three operative positions.
Figure 9B:
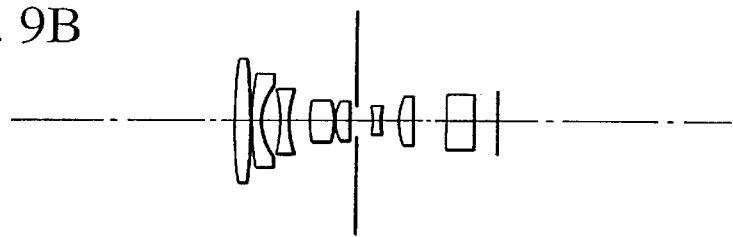
Figure 9C:
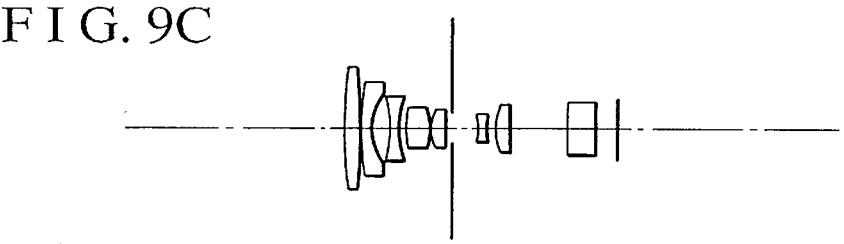
Figures 10A, 10B, 10C, 10D:
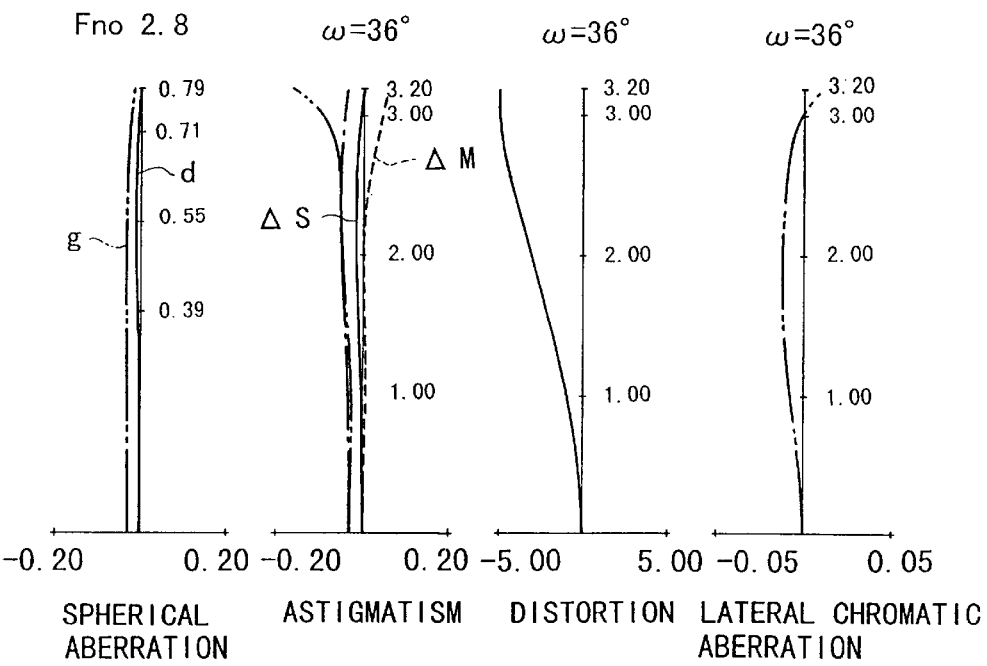
FIGS. 10A to 10D are graphic representations of the aberrations of the numerical example 3 of the zoom lens at the wide-angle end.
Figure 13A:
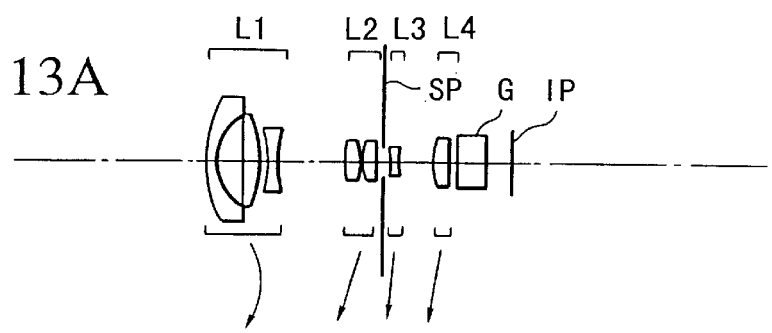
FIGS. 13A to 13C are longitudinal section views of a numerical example 4 of the zoom lens in three operative positions.
Figure 13B:
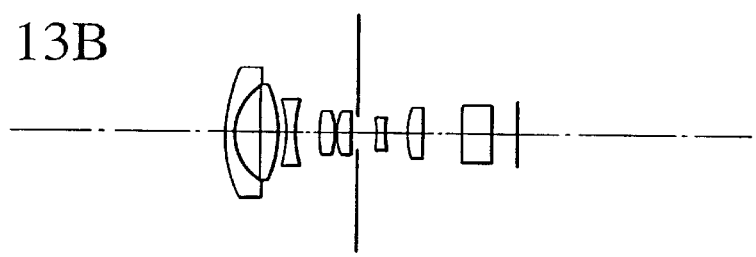
Figure 13C:
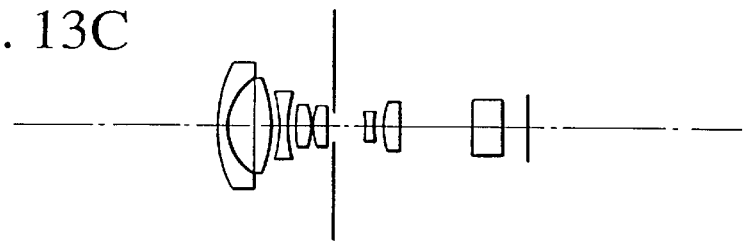
Figures 14A, 14B, 14C, 14D:
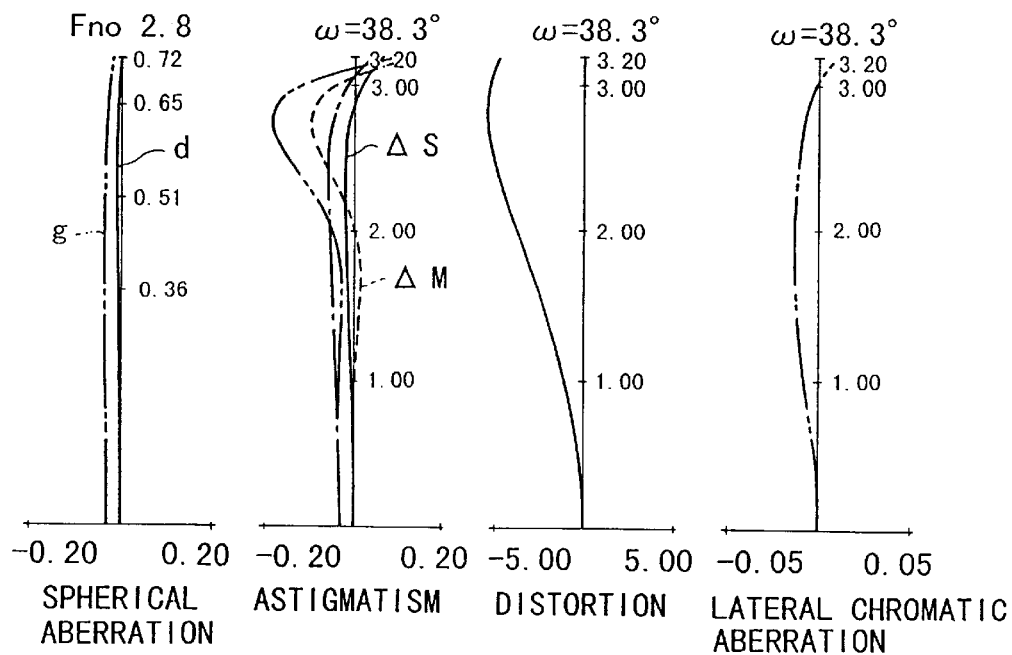
FIGS. 14A to 14D are graphic representations of the aberrations of the numerical example 4 of the zoom lens at the wide-angle end.
Figure 17A:
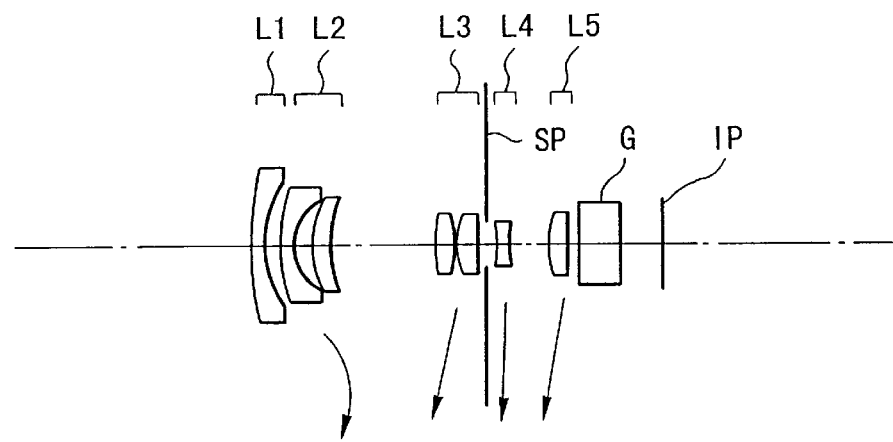
FIGS. 17A to 17C are longitudinal section views of a numerical example 5 of the zoom lens in three operative positions.
Figure 17B:
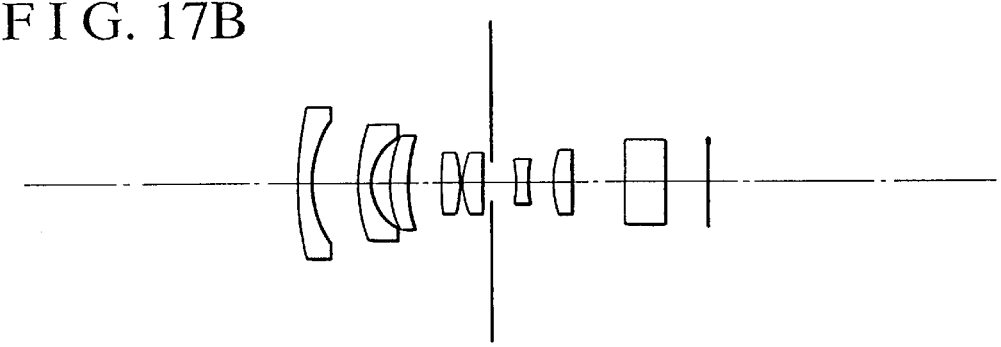
Figure 17C:
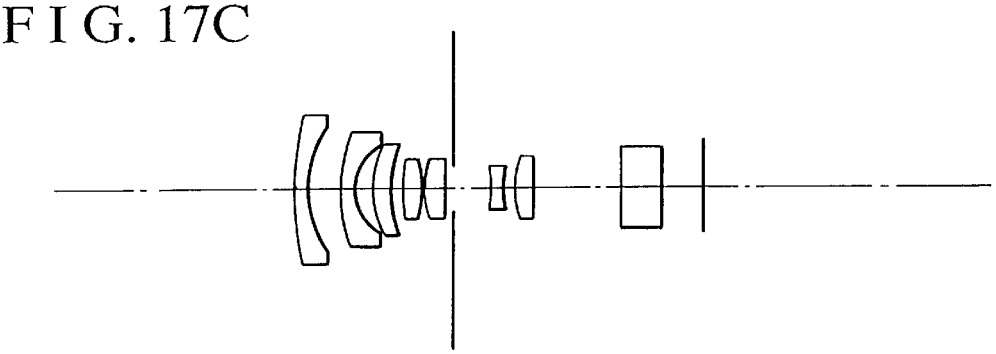
Figure 18A:
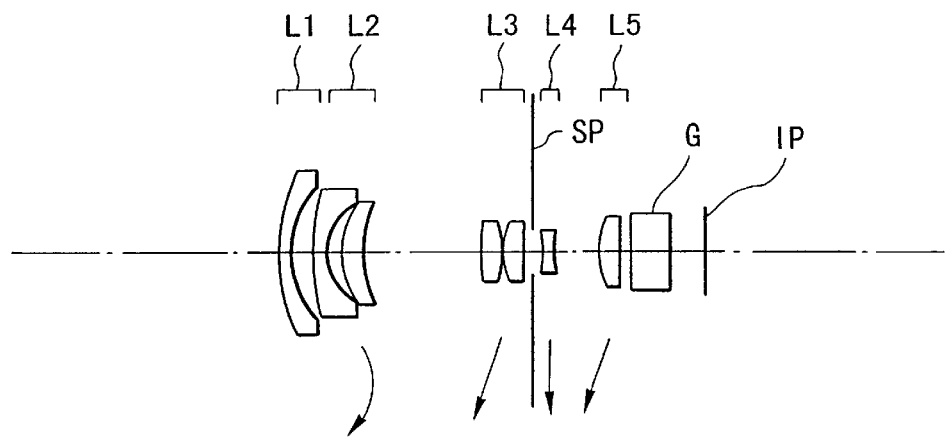
FIGS. 18A to 18C are longitudinal section views of a numerical example 6 of the zoom lens in three operative positions.
Figure 18B:
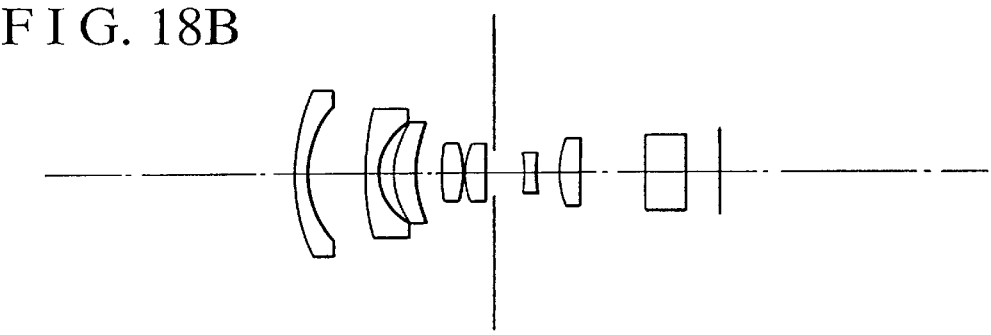
Figure 18C:
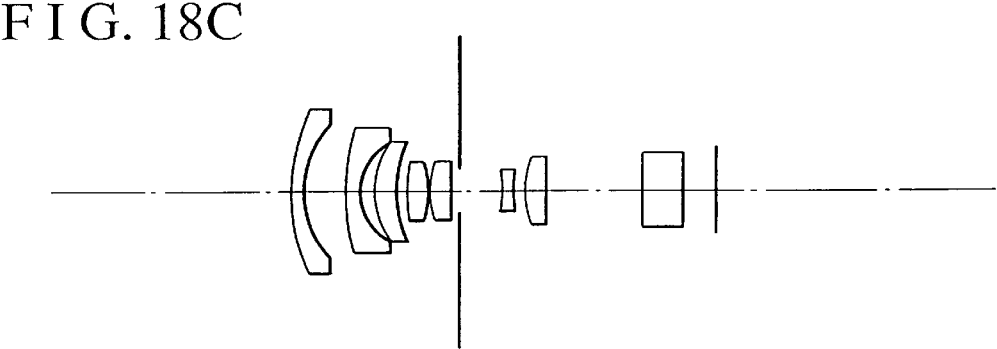
Figure 19A:
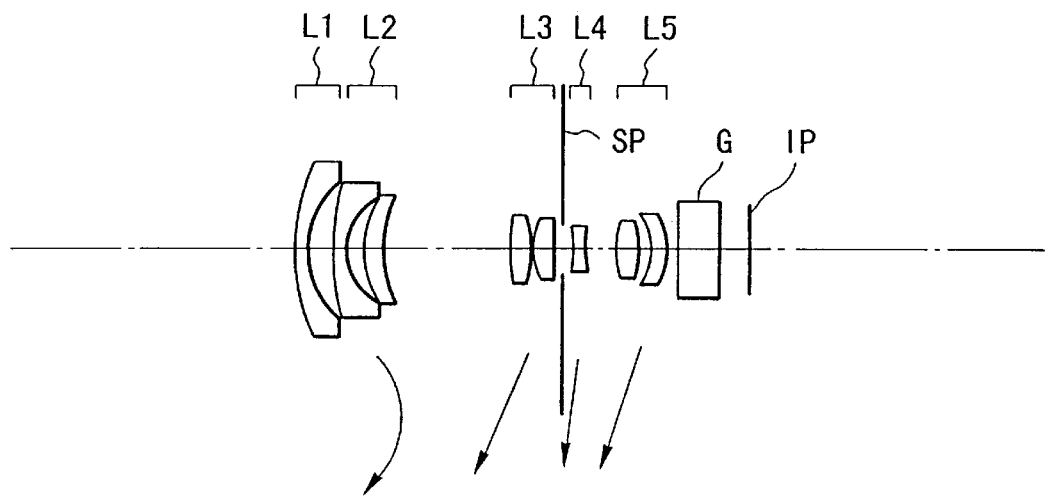
FIGS. 19A to 19C are longitudinal section views of a numerical example 7 of the zoom lens in three operative positions.
Figure 19B:
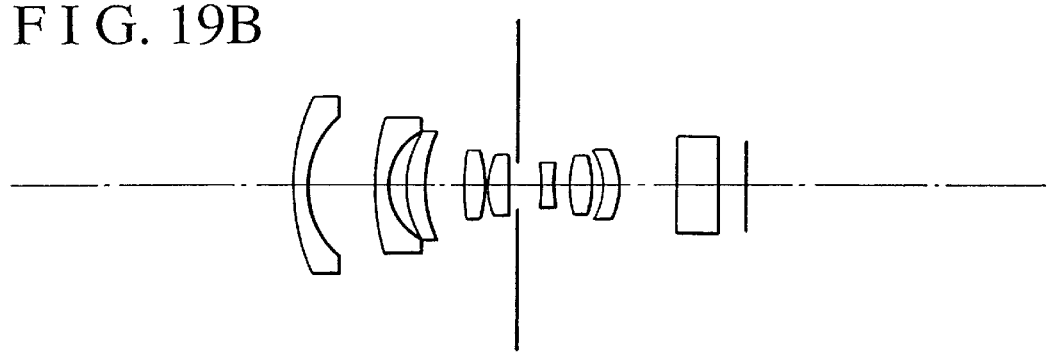
Figure 19C:
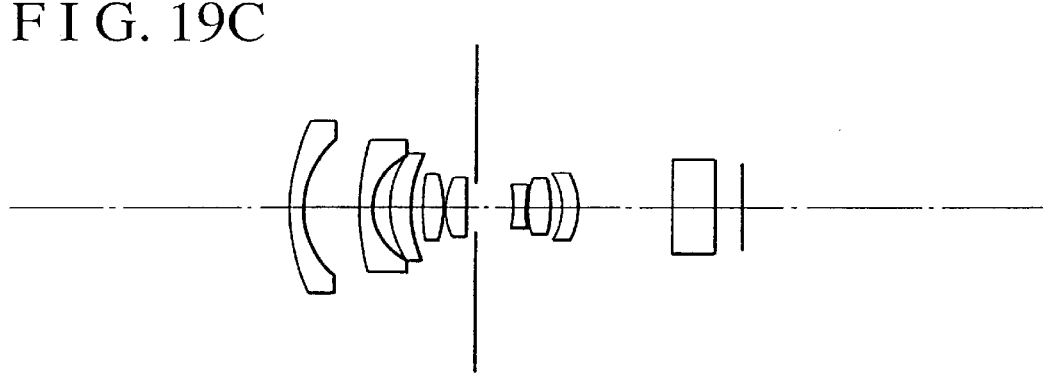
Figures 20A, 20B, 20C, 20D:
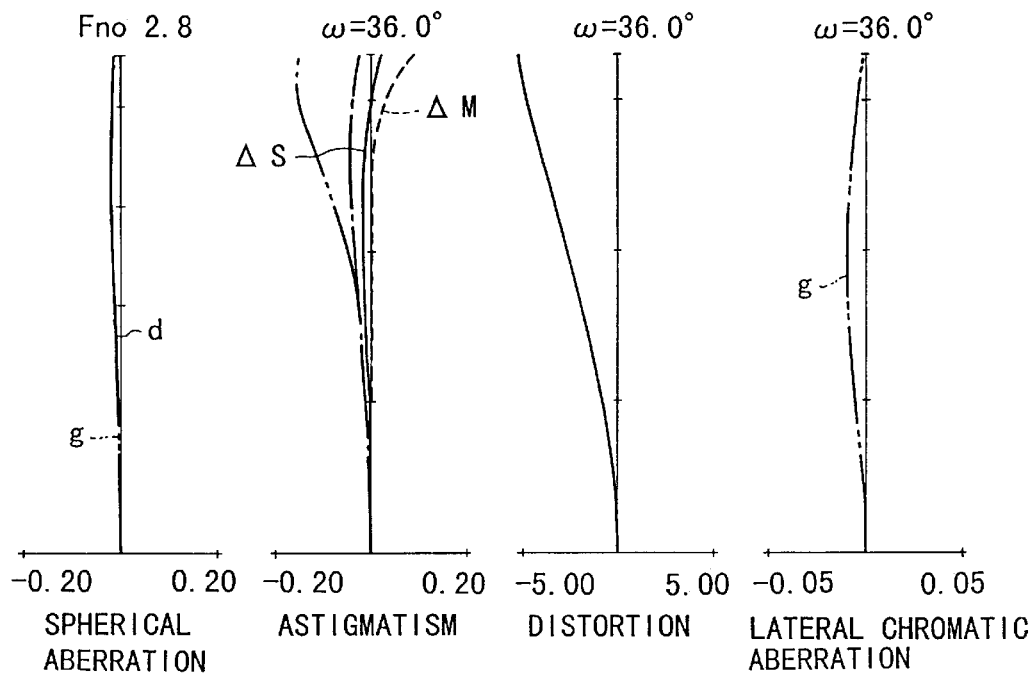
FIGS. 20A to 20D are graphic representations of the aberrations of the numerical example 5 of the zoom lens at the wide-angle end.
Figures 21A, 21B, 21C, 21D:
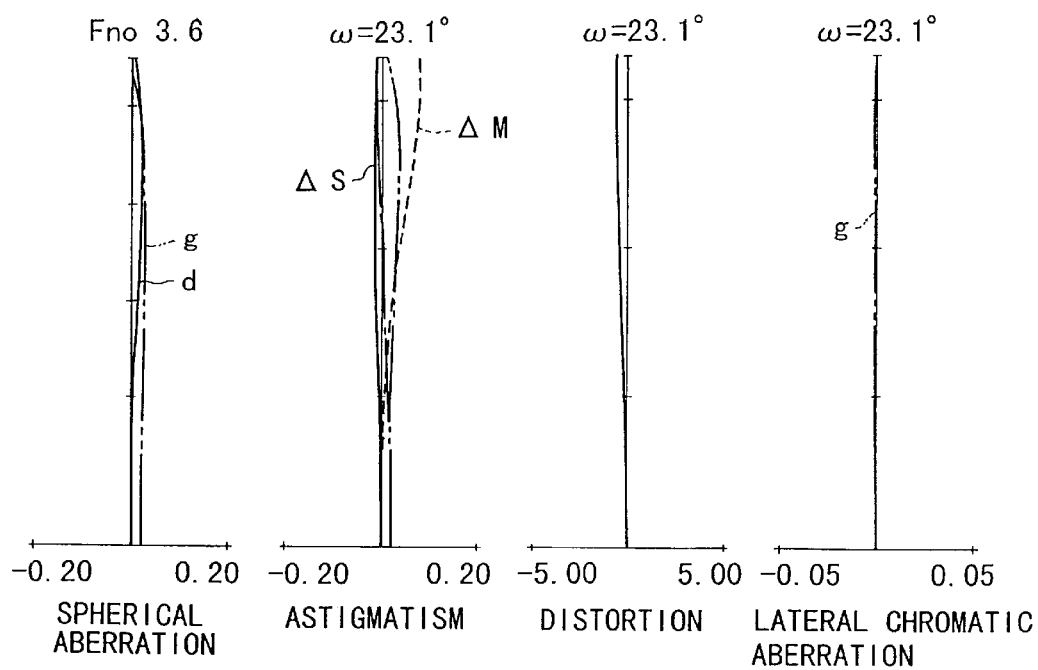
FIGS. 21A to 21D are graphic representations of the aberrations of the numerical example 5 of the zoom lens in a middle focal length position.
Figures 28A, 28B, 28C, 28D:
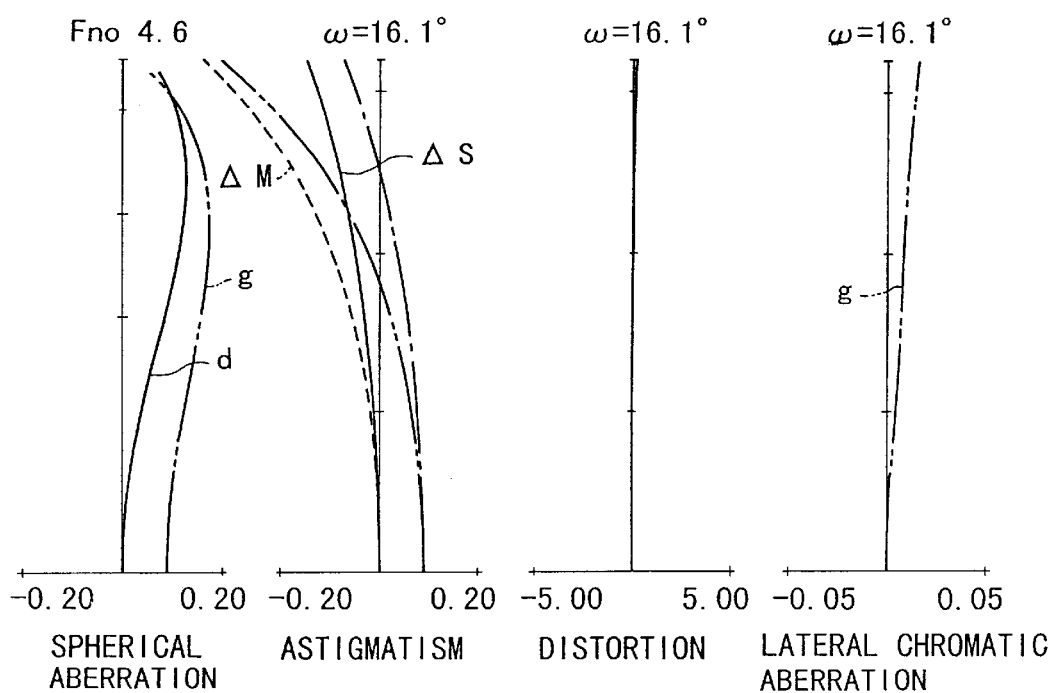
FIGS. 28A to 28D are graphic representations of the aberrations of the numerical example 7 of the zoom lens at the telephoto end.
Figure 29A:
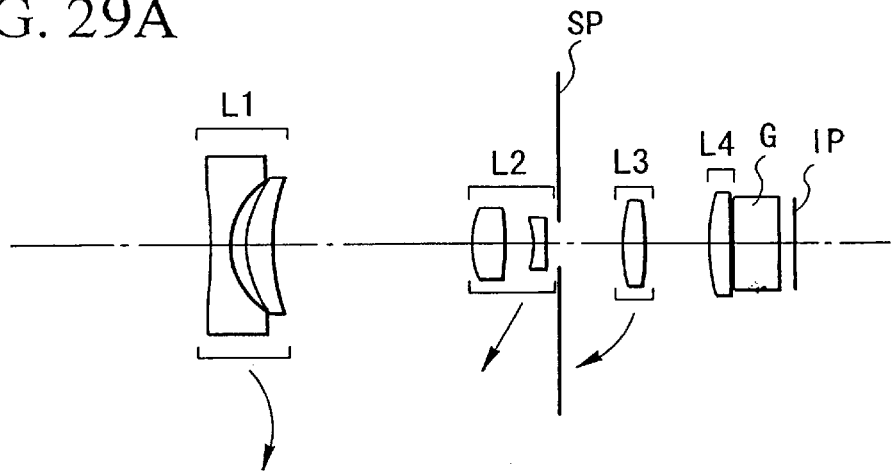
FIGS. 29A to 29C are longitudinal section views of a numerical example 8 of the zoom lens in three operative positions.
Figure 29B:
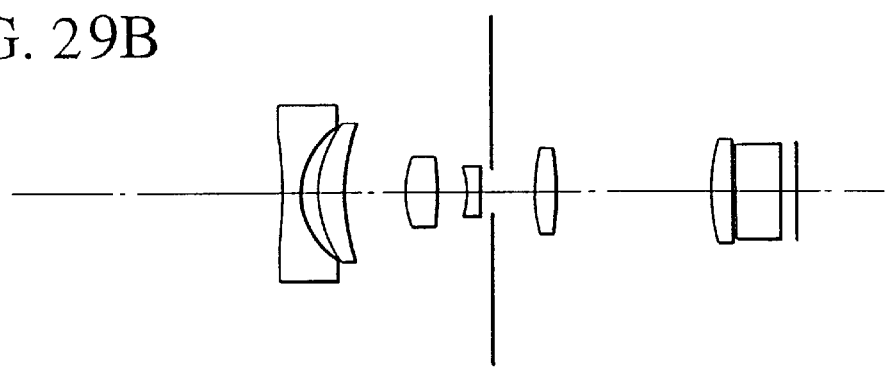
Figure 29C:
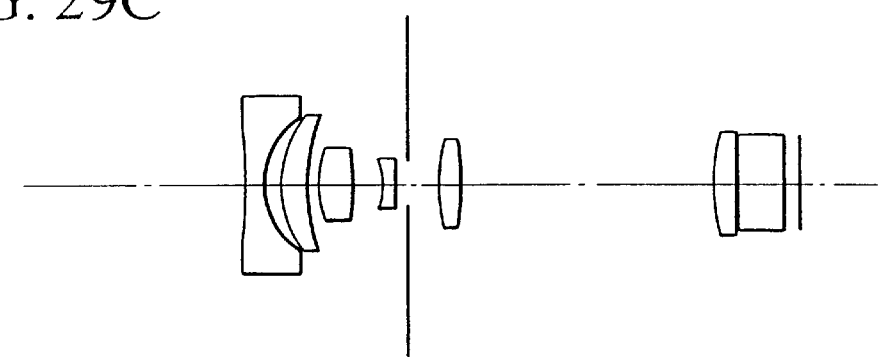

FIGS. 1A to 1C in block diagram show a zoom lens of the numerical example 1 whose data will be described later. FIGS. 2A to 2D through FIGS. 4A to 4D show the aberrations of the zoom lens of the numerical example 1 at the wide-angle end, the middle focal length position and the telephoto end, respectively. FIGS. 5A to 5C in block diagram show a zoom lens of the numerical example 2 whose data will be described later. FIGS. 6A to 6D through FIGS. 8A to 8D show the aberrations of the zoom lens of the numerical example 2 at the wide-angle end, the middle focal length position and the telephoto end, respectively. FIGS. 9A to 9C in block diagram show a zoom lens of the numerical example 3 whose data will be described later. FIGS. 10A to 10D through FIGS. 12A to 12D show the aberrations of the zoom lens of the numerical example 3 at the wide-angle end, the middle focal length position and the telephoto end, respectively. FIGS. 13A to 13C in block diagram show a zoom lens of the numerical example 4 whose data will be described later. FIGS. 14A to 14D through FIGS. 16A to 16D show the aberrations of the zoom lens of the numerical example 4 of the zoom lens at the wide-angle end, the middle focal length position and the telephoto end, respectively.

Referring to FIGS. 1A, 5A, 9A and 13A, the zoom lens comprises, in order from the object side, a first lens unit L1 of negative refractive power, a second lens unit L2 of positive refractive power, a third lens unit L3 of negative refractive power and a fourth lens unit L4 of positive refractive power. The arrows indicate the directions in which the respective lens units move during zooming from the wide-angle end to the telephoto end. SP stands for a stop and IP stands for an image plane. G denotes a glass block: such as a face plate or a color filter.

In the first embodiment, during zooming from the wide-angle end to the telephoto end, all the lens units are made to move along the optical axis in such a manner that the separation between the first and second lens units and the separation between the third and fourth lens units decrease and the separation between the second and third lens units increases. This arrangement assures achievement of a certain zoom ratio (of 2.2 or higher) and a valuable increase of the maximum field angle with advantages. Nonetheless, the required total number of constituent lenses for securing a certain optical performance is made smaller in order to insure improvements of the compact form of the entire lens system.

In particular, as zooming from the wide-angle end to the telephoto end, the first lens unit moves in a locus convex toward the image side, and the second, third and fourth lens units move toward the object side monotonously. Further, during zooming, the second and fourth lens units move either in unison or independently of each other. By using such a zoom configuration, a compact zoom lens having a range of 2.2 or higher is achieved.

Next, the features of each of the numerical examples 1 to 4 in the first embodiment are described with respect to the form and the construction and arrangement of the constituent lenses.

Referring first to FIGS. 1A to 1C, the zoom lens of the numerical example 1 has the characteristic features described below. The first lens unit L1 is composed of two lenses, of which the front is a negative lens of meniscus form, convex toward the object side and the rear is a positive lens of meniscus form, convex toward the object side.

The second lens unit L2 is composed of two lenses, of which the front is a positive lens of bi-convex form and the rear is a positive lens of meniscus form, convex toward the object side. The third lens unit L3 is composed of one lens which is a negative lens of bi-concave form. The fourth lens unit L4 is composed of one lens which is a positive lens of bi-convex form.

The front surface of the positive lens in the first lens unit L1 is made aspherical. The aperture stop SP is positioned in between the second and third lens units L2 and L3 and arranged on zooming to move in unison with the second lens unit L2. The rear surface of the positive lens in the fourth lens unit L4 is made aspherical.

Referring next to FIGS. 5A to 5C, the zoom lens of the numerical example 2 has the characteristic features described below. The first lens unit L1 is composed of three lenses, of which the front two are negative lenses of meniscus form, convex toward the object side and the rear is a positive lens of meniscus form, convex toward the object side.

The second lens unit L2 is composed of two lenses, of which the front is a positive lens of bi-convex form and the rear is a positive lens of meniscus form, convex toward the object side. The third lens unit L3 is composed of one lens, which is a negative lens of biconcave form. The fourth lens unit L4 is composed of one lens, which is a positive lens of meniscus form, convex toward the object side.

The front surface of the positive lens in the first lens unit L1 is made aspherical. The aperture stop SP is positioned in between the second and third lens units L2 and L3 and arranged on zooming to move in unison with the second lens unit L2. The rear surface of the positive lens in the fourth lens unit L4 is made aspherical.

Referring next to FIGS. 9A to 9C, the zoom lens of the numerical example 3 has characteristic features described below. The first lens unit L1 is composed of three lenses, i.e., in order from the object side, a positive lens of hi-convex form, a negative lens of meniscus form convex toward the object side, and a negative lens of bi-concave form.

The second lens unit L2 is composed of two lenses, of which the front is a positive lens of bi-convex form and the rear is a positive lens of meniscus form, convex toward the object side. The third lens unit L3 is composed of one lens, which is a negative lens of bi-concave form. The fourth lens unit L4 is composed of one lens, which is a positive lens of hi-convex form.

The front surface of the bi-concave lens in the first lens unit L1 is made aspherical. The aperture stop SP is positioned in between the second and third lens units L2 and L3 and arranged on zooming to move in unison with the second lens unit L2. The rear surface of the positive lens in the fourth lens unit L4 is made aspherical.

Referring next to FIGS. 13A to 13C, the zoom lens of the numerical example 4 has the characteristic features described below. The first lens unit L1 is composed of three lenses, i.e., in order from the object side, a negative lens of meniscus form, convex toward the object side, a positive lens of meniscus form, convex toward the image side, and a negative lens of bi-concave form.

The second lens unit L2 is composed of two lenses, of which the front is a positive lens of bi-convex form and the rear is a positive lens of meniscus form, convex toward the object side. The third lens unit L3 is composed of one lens, which is a negative lens of bi-concave form. The fourth lens unit L4 is composed of one lens, which is a positive lens of bi-convex form.

The aperture stop SP is positioned in between the second and third lens units L2 and L3 and arranged on zooming to move in unison with the second lens unit L2. The rear surface of the positive lens in the fourth lens unit L4 is made aspherical.

These zoom lenses in the first embodiment have other features in common described below. Incidentally, any one of these features as described in respective articles produces an effect which works independently of the others.

(A1) Letting the separations at the wide-angle end and the telephoto end between the first and second lens units be denoted by D12W and D12T, respectively, and the separations at the wide-angle end and the telephoto end between the third and fourth lens units be denoted by D34W and D34T, respectively, the following condition is satisfied:

$$2<(D12W-D12T)/(D34W-D34T)<5 \qquad (1)$$

The inequalities of condition (1) have an aim to simultaneously fulfill the requirements of improving the compact form of the entire lens system and of securing a certain zoom ratio. When the upper limit of the condition (1) is exceeded, as this means that the separation between the first and second lens units varies too largely with zooming, or is too large at the wide-angle end, the diameter of the front lens members increases objectionably. When the lower limit of the condition (1) is exceeded, as the variation with zooming of the separation between the first and second lens units is too small, it becomes difficult to secure the certain zoom ratio.

It is to be noted in connection with the present embodiment that, for better results, the condition (1) is preferably to be altered as follows:

$$2.3<(D12W-D12T)/(D34W-D34T)<4.0 \qquad (1a)$$

(A2) The third and fourth lens units, during zooming, move in such differential relation as follows:

$$1.5<D34W/D34T<8.0 \qquad (2)$$

where D34W and D34T are the separations at the wide-angle end and the telephoto end between the third and fourth lens units, respectively.

The inequalities of condition (2) give a proper range for the variation of the separation between the third and fourth lens units with zooming and have as aims to minimize the variation of the exit pupil with zooming and to prevent the diameter of the rear lens members from increasing. When the upper limit of the condition (2) is exceeded, as this means that the separation between the third and fourth lens units is too large at the wide-angle end, the diameter of the rear lens members increases objectionably.

When the variation with zooming of the separation between the third and fourth lens units is too small as exceeding the lower limit of the condition (2), the exit pupil varies its position largely during zooming. So, the violation is objectionable.

For better results, it is more preferred in the present embodiment to set forth the condition (2) as follows:

$$23<D34W/D34T<5 \qquad (2a)$$

(A3) As the aperture stop is provided in between the second and third lens units and the fourth lens unit is provided with the aspheric surface, the distance DA4 from the aperture stop to the aspheric surface lies in the following range:

$$1 < DA4/fW < 3 \quad (3)$$

where fW is the focal length at the wide-angle end of the entire lens system.

The inequalities of condition (3) give a range for the distance between the stop and the aspheric surface in the fourth lens unit at the wide-angle end and have an aim chiefly to correct well coma at the wide-angle end. When the condition (3) is violated, it becomes difficult to sufficiently correct coma at the wide-angle end.

For better results, it is more preferred in the present embodiment to set forth the condition (3) as follows:

$$1.2 < DA4/fW < 2 \quad (3a)$$

Next, the data for the numerical examples 1 to 4 are shown in tables below. In the tables, Ri is the radius of curvature of the i-th lens surface, when counted from the object side, Di is the i-th lens thickness or air separation, when counted from the object side, and Ni and νi are respectively the refractive index and Abbe number of the material of the i-th lens element, when counted from the object side. The values of the factors in the above-described conditions (1) to (3) for the numerical examples 1 to 9 are listed in Table-1.

The shape of an aspheric surface is expressed in the coordinates with an X axis in the axial direction and an H axis in the direction perpendicular to an optical axis, the direction in which light advances being taken as positive, by the following equation:

$$X = \frac{(1/R)H^2}{1 + \sqrt{1 - (H/R)^2}} + AH^2 + BH^4 + CH^6 + DH^8 + EH^{10}$$

where R is the radius of the osculating sphere, and A, B, C, D and E are the aspheric coefficients. Further, the notation "e-OX" means "$\times 10^{-X}$".

Numerical Example 1:

| f = 4.40~11.00 | Fno = 2.80~4.6 | 2ω = 72.1° ~32.4° | |
|---|---|---|---|
| R 1 = 27.996 | D 1 = 1.00 | N 1 = 1.697000 | ν 1 = 55.5 |
| R 2 = 3.798 | D 2 = 1.63 | | |
| R 3 = 10.988 | D 3 = 1.32 | N 2 = 1.847000 | ν 2 = 23.8 |
| R 4 = 11.517 | D 4 = Variable | | |
| R 5 = 17.311 | D 5 = 1.77 | N 3 = 1.529228 | ν 3 = 65.7 |
| R 6 = −9.337 | D 6 = 0.20 | | |
| R 7 = 4.820 | D 7 = 1.48 | N 4 = 1.494900 | ν 4 = 69.4 |
| R 8 = 37.917 | D 8 = 0.70 | | |
| R 9 = Stop | D 9 = Variable | | |
| R10 = −14.774 | D10 = 1.00 | N 5 = 1.815942 | ν 5 = 24.6 |
| R11 = 15.902 | D11 = Variable | | |
| R12 = 5.913 | D12 = 1.34 | N 6 = 1.487000 | ν 6 = 70.4 |
| *R13 = 225.564 | D13 = Variable | | |
| R14 = ∞ | D14 = 3.00 | N 7 = 1.516330 | ν 7 = 64.2 |
| R15 = ∞ | | | |

| Variable | Focal Length | | |
|---|---|---|---|
| Separation | 4.40 | 7.50 | 11.00 |
| D 4 | 7.60 | 2.81 | 0.80 |
| D 9 | 0.70 | 1.69 | 2.70 |
| D11 | 2.76 | 1.77 | 0.76 |
| D13 | 0.80 | 3.12 | 5.60 |

Aspheric Coefficients:

| R 3: | k = 0.00000e+00 | A = 0 | B = 5.63361e−04 |
|---|---|---|---|
| | C = 1.01188e−04 | D = −9.39305e−D6 | E = 6.48529e−D7 |
| R13: | k = 0.00000e+00 | A = 0 | B = 3.55744e−D3 |
| | C = 1.24089e−04 | D = −3.06263e−05 | E = 3.52594e−D6 |

Numerical Example 2:

| f = 4.40~11.01 | Fno = 2.80~4.6 | 2ω = 72.1° ~32.4° | |
|---|---|---|---|
| R 1 = 20.343 | D 1 = 1.00 | N 1 = 1.659275 | ν 1 = 57.1 |
| R 2 = 4.693 | D 2 = 1.38 | | |
| R 3 = 7.820 | D 3 = 1.00 | N 2 = 1.697000 | ν 2 = 55.5 |
| R 4 = 4.386 | D 4 = 1.02 | | |
| *R 5 = 8.193 | D 5 = 1.35 | N 3 = 1.847000 | ν 3 = 23.8 |
| R 6 = 9.560 | D 6 = Variable | | |
| R 7 = 17.115 | D 7 = 1.50 | N 4 = 1.494952 | ν 4 = 69.4 |
| R 8 = −8.881 | D 8 = 0.20 | | |
| R 9 = 4.859 | D 9 = 1.51 | N 5 = 1.487000 | ν 5 = 70.4 |
| R10 = 70.517 | D10 = 0.70 | | |
| R11 = Stop | D11 = Variable | | |
| R12 = −13.721 | D12 = 1.00 | N 6 = 1.847000 | ν 6 = 23.8 |
| R13 = 21.968 | D13 = Variable | | |
| R14 = 7.132 | D14 = 1.26 | N 7 = 1.578153 | ν 7 = 61.7 |
| *R15 = 168.746 | D15 = Variable | | |
| R16 = ∞ | D16 = 3.00 | N 8 = 1.516330 | ν 8 = 64.2 |
| R17 = ∞ | | | |

| Variable | Focal Length | | |
|---|---|---|---|
| Separation | 4.40 | 7.50 | 11.01 |
| D 6 | 6.98 | 2.64 | 0.80 |
| D11 | 0.70 | 1.62 | 2.70 |
| D13 | 2.75 | 1.83 | 0.75 |
| D15 | 0.80 | 3.47 | 6.07 |

Aspheric Coefficients:

| R 5: | k = 0.00000e+00 | A = 0 | B = 7.41955e−04 |
|---|---|---|---|
| | C = 3.25222e−05 | D = 9.26293e−07 | E = 5.54121e−08 |
| R15: | k = 0.0000e+00 | A = 0 | B = 2.52516e−03 |
| | C = 1.90859e−04 | D = −4.95038e−05 | E = 5.47322e−06 |

Numerical example 3:

| f = 4.40~11.00 | Fno = 2.80~4.6 | 2ω = 72.1° ~32.4° | |
|---|---|---|---|
| R 1 = 49.456 | D 1 = 1.63 | N 1 = 1.846659 | ν 1 = 23.8 |
| R 2 = −63.039 | D 2 = 0.20 | | |
| R 3 = 38.338 | D 3 = 1.00 | N 2 = 1.731271 | ν 2 = 51.4 |
| R 4 = 6.000 | D 4 = 1.78 | | |
| *R 5 = −24.948 | D 5 = 1.00 | N 3 = 1.665320 | ν 3 = 55.4 |
| R 6 = 8.680 | D 6 = Variable | | |
| R 7 = 16.559 | D 7 = 2.50 | N 4 = 1.487000 | ν 4 = 70.4 |
| R 8 = −7.743 | D 8 = 0.20 | | |
| R 9 = 4.507 | D 9 = 1.47 | N 5 = 1.487000 | ν 5 = 70.4 |
| R10 = 71.146 | D10 = 0.70 | | |
| R11 = Stop | D11 = Variable | | |
| R12 = −10.160 | D12 = 1.00 | N 6 = 1.731623 | ν 6 = 27.7 |
| R13 = 13.142 | D13 = Variable | | |
| R14 = 5.240 | D14 = 1.82 | N 7 = 1.583126 | ν 7 = 59.4 |
| *R15 = −891.564 | D15 = Variable. | | |
| R16 = ∞ | D16 = 3.00 | N 8 = 1.516330 | ν 8 = 64.2 |
| R17 = ∞ | | | |

| Variable | Focal Length | | |
|---|---|---|---|
| Separation | 4.40 | 7.50 | 11.00 |
| D 6 | 5.98 | 2.25 | 0.80 |
| D11 | 0.70 | 1.70 | 2.70 |
| D13 | 2.80 | 1.80 | 0.80 |
| D15 | 0.80 | 3.45 | 6.14 |

Aspheric Coefficients:

| R 5: | k = 0.00000e+00 | A = 0 | B = −5.69394e−04 |
|---|---|---|---|
| | C = 3.49652e−05 | D = −4.54411e−06 | E = 1.18831e−07 |
| R15: | k = 0.00000e+00 | A = 0 | B = 3.27203e−03 |

-continued

| C = 1.35228e−04 | D = −2.19414e−05 | E = 1.41772e−06 |
|---|---|---|

Numerical Example 4:

| f = 4.05~11.90 | Fno = 2.80~5.6 | 2ω = 76.6° ~30.1° | |
|---|---|---|---|
| R 1 = 13.762 | D 1 = 1.00 | N 1 = 1.732565 | ν 1 = 51.3 |
| R 2 = 5.500 | D 2 = 2.75 | | |
| R 3 = −239.477 | D 3 = 1.77 | N 2 = 1.847000 | ν 2 = 23.8 |
| R 4 = −11.559 | D 4 = 0.86 | | |
| R 5 = −10.852 | D 5 = 1.00 | N 3 = 1.874563 | ν 3 = 41.3 |
| R 6 = 10.557 | D 6 = Variable | | |
| R 7 = 15.981 | D 7 = 1.48 | N 4 = 1.487000 | ν 4 = 70.4 |
| R 8 = −7.732 | D 8 = 0.20 | | |
| R 9 = 4.838 | D 9 = 1.46 | N 5 = 1.487000 | ν 5 = 70.4 |
| R10 = 207.458 | D10 = 0.70 | | |
| R11 = Stop | D11 = Variable | | |
| R12 = −9.910 | D12 = 1.00 | N 6 = 1.766557 | ν 6 = 27.7 |
| R13 = 16.192 | D13 = Variable | | |
| R14 = 5.846 | D14 = 1.63 | N 7 = 1.583126 | ν 7 = 59.4 |
| *R15 = −319.184 | D15 = Variable | | |
| R16 = ∞ | D16 = 3.00 | N 8 = 1.516330 | ν 8 = 64.2 |
| R17 = ∞ | | | |

| Variable | Focal Length | | |
|---|---|---|---|
| Separation | 4.05 | 7.50 | 11.90 |
| D 6 | 6.87 | 2.44 | 0.80 |
| D11 | 0.70 | 1.87 | 3.20 |
| D13 | 3.30 | 2.13 | 0.80 |
| D15 | 0.80 | 4.00 | 7.48 |

Aspheric Coefficients:

| R15: | k = 0.00000e+00 | A = 0 | B = 2.61456e−03 |
|---|---|---|---|
| | C = 7.72134e−05 | D = −2.06081e−05 | E = 1.94947e−06 |

TABLE 1

| | Numerical Example | | | |
|---|---|---|---|---|
| Condition | 1 | 2 | 3 | 4 |
| (1) D12W−D12T D34W−D34T | 3.4 | 3.09 | 2.59 | 2.43 |
| (2) D34W/D34T | 3.63 | 3.67 | 3.50 | 4.13 |
| (3) DA4/fW | 1.32 | 1.30 | 1.44 | 1.64 |

It will be appreciated from the foregoing that, according to the first embodiment disclosed as applied to the type of zoom lens in which the first lens unit is negative in refractive power, or the negative lead type, with four lens units in total, the refractive powers of all the lens units and the form and the construction and arrangement of the constituent lenses are appropriately determined to limit the total number of lens elements to 6 or 7. This assure simplification of the form of the entire lens system. It is, therefore, made possible to achieve a zoom lens whose field angle for the wide-angle end is 70° or wider and range is 2.5–3, and F-number is about 2.8 at the wide-angle end, and which has a high optical performance over the entire zooming range.

(Second Embodiment)

Next, using FIGS. 17A to 17C through FIGS. 28A to 28D, a second embodiment (numerical examples 5 to 7) of the invention is described below.

FIGS. 17A to 17C through FIGS. 19A to 19C in block diagram show the numerical examples 5 to 7, whose data will be described later. Of these figures, the ones suffixed "A" are at the wide-angle end, the ones suffixed "B" in a middle focal length position and the ones suffixed "C" at the telephoto end.

Referring to FIGS. 17A to 17C through FIGS. 19A to 19C, the zoom lens comprises, in order from the object side, a first lens unit L1 of negative refractive power, a second lens unit L2 of negative refractive power, a third lens unit L3 of positive refractive power, a fourth lens unit L4 of negative refractive power and a fifth lens unit L5 of positive refractive power. A stop SP is positioned in between the third and fourth lens units. A glass block G, such as an infrared cut filter, lies in front of an image plane IP. The arrows indicate the respective loci of motion of the second to fifth lens units during zooming from the wide-angle end to the telephoto end.

In the second embodiment, zooming is performed by varying all the separations between any adjacent two of the lens units. In particular, as zooming goes from the wide-angle end to the telephoto end, the air separation between the first and second lens units becomes longest in the middle focal length position, the air separation between the second and third lens units decreases, the air separation between the third and fourth lens units increases, and the air separation between the fourth and fifth lens units decreases. The stop, during zooming, axially moves in unison with the third lens unit.

Incidentally, although, in the second embodiment, the first lens unit remains stationary during zooming, it may be made to move.

In the second embodiment, during zooming from the wide-angle end to the telephoto end, the first lens unit remains stationary and the third, fourth and fifth lens units move toward the object side monotonously, while the second lens unit moves in a locus convex toward the image side. The third and fifth lens units are made to move in unison during zooming. These features assure simplification of the operating mechanism in such a manner as to secure the certain zoom ratio.

The first lens unit or the second lens unit is provided with at least one aspheric surface to correct well the variation of aberrations with zooming. The rear surface of a positive lens in the fifth lens unit is also made aspherical to maintain good stability of the image quality over the entire area of the frame. The third lens unit is constructed with a single positive lens or a plurality of positive lenses only.

Next, the features of each of the numerical examples 5 to 7 are described. In all the numerical examples 5 to 7, the first lens unit L1 is composed of a negative single lens of meniscus form, convex toward the object side.

The second lens unit L2 is composed of two lenses, of which the front is a negative lens whose rear surface is tough in curvature (small in the radius of curvature) and the rear is a positive lens of meniscus form, convex toward the object side. The third lens unit L3 is composed of two positive lenses. The fourth lens unit L4 is composed of a negative single lens of bi-concave form.

In the numerical examples 5 and 6, the fifth lens unit is composed of a positive single lens whose front surface is convex. In the numerical example 7, the fifth lens unit is composed of two lenses, i.e., in order from the object side, a positive lens of bi-convex form and a negative lens of meniscus form, concave toward the object side. In all the numerical examples 5 to 7, the rear surface of the positive lens in the fifth lens unit is made aspherical.

The features described above suffice for achieving the zoom lenses of the second embodiment. To facilitate the widening of the field angle and further improve the optical performance throughout the entire zooming range, it is preferable to satisfy the following conditions.

(B1) Letting the separation at the wide-angle end between the i-th lens unit and the (i+1)st lens unit be denoted by diw and the separation at the telephoto end between the i-th lens unit and the (i+1)st lens unit be denoted by dit, the following condition is satisfied:

$$2 < (d2w - d2t)/(d4w - d4t) < 6 \quad (4)$$

The inequalities of condition (4) are concerned with the variation with zooming of the separation between the second and third lens units and the variation with zooming of the separation between the fourth and fifth lens units. When the upper limit of the condition (4) is exceeded, as this means that the separation between the second and third lens units varies too largely with zooming, or is too large at the wide-angle end, the diameter of the front lens members increases objectionably.

When the lower limit of the condition (4) is exceeded, as the variation with zooming of the separation between the second and third lens units is too small, it becomes difficult to secure the certain zoom ratio.

It is to be noted that the condition (4) is more preferably revised to the following range:

$$2.3 < (d2w - d2t)/(d4w - d4t) < 4.5 \quad (4a)$$

(B2) Letting the separation at the wide-angle end between the i-th lens unit and the (i+1)st lens unit be denoted by diw and the separation in the telephoto end between the i-th lens unit and the (i+1)st lens unit be denoted by dit, the following condition is satisfied:

$$1.5 < d4w/d4t < 15 \quad (5)$$

The inequalities of condition (5) are concerned with the separations between the fourth and fifth lens units at the wide-angle end and the telephoto end. When the upper limit of the condition (5) is exceeded, as this means that the separation between the third and fourth lens units is too large at the wide-angle end, the diameter of the rear lens members is caused to increase objectionably.

When the variation with zooming of the separation between the third and fourth lens units is too small as exceeding the lower limit of the condition (5), the exit pupil varies its position largely during zooming. So, the violation is objectionable. Incidentally, the condition (5) is more preferably revised to the following range:

$$3 < d4w/d4t < 12 \quad (5a)$$

(B3) Letting the separation at the wide-angle end between the i-th lens unit and the (i+1)st lens unit be denoted by dew and the separation at the telephoto end between the i-th lens unit and the (i+1)st lens unit be denoted by dit, the following condition is satisfied:

$$0.3 < d1w/d1t < 0.9 \quad (6)$$

The inequalities of condition (6) are concerned with the ratio of the separations between the first and second lens units at the wide-angle end and the telephoto end. When the upper limit of the condition (6) is exceeded, as this means that the separation between the first and second lens units is too large at the wide-angle end, the diameter of the front lens members is caused to increase objectionably. When the lower limit of the condition (6), as this means that the separation between the first and second lens units is too large at the telephoto end, the total length of the entire lens system is caused to increase objectionably.

Incidentally, the condition (6) is more preferably revised to the following range:

$$0.4 < d1w/d1t < 0.6 \quad (6a)$$

Next, the numerical data for the examples 5 to 7 of the second embodiment are shown in tables below. The values of the factors in the above-described conditions (4) to (6) for the numerical examples 5 to 7 are listed in Table-2.

Numerical Example 5:

| | | | |
|---|---|---|---|
| f = 4.40~11.00 | Fno = 2.80~4.6 | 2ω = 72.1° ~32.4° | |
| R 1 = 24.015 | D 1 = 1.00 | N 1 = 1.544274 | ν 1 = 64.4 |
| R 2 = 7.697 | D 2 = Variable | | |
| R 3 = 12.686 | D 3 = 1.00 | N 2 = 1.697000 | ν 2 = 55.5 |
| R 4 = 3.883 | D 4 = 1.32 | | |
| *R 5 = 8.543 | D 5 = 1.36 | N 3 = 1.847000 | ν 3 = 23.8 |
| R 6 = 10.008 | D 6 = Variable | | |
| R 7 = 14.544 | D 7 = 1.45 | N 4 = 1.487000 | ν 4 = 70.4 |
| R 8 = −9.023 | D 8 = 0.20 | | |
| R 9 = 4.913 | D 9 = 1.45 | N 5 = 1.487000 | ν 5 = 70.4 |
| R10 = 35.093 | D10 = 0.70 | | |
| R11 = Stop | D11 = Variable | | |
| R12 = −13.815 | D12 = 1.00 | N 6 = 1.806672 | ν 6 = 25.9 |
| R13 = 15.169 | D13 = Variable | | |
| R14 = 6.537 | D14 = 1.42 | N 7 = 1.487000 | ν 7 = 70.4 |
| *R15 = −23.648 | D15 = Variable | | |
| R16 = ∞ | D16 = 3.00 | N 8 = 1.516330 | ν 8 = 64.2 |
| R17 = ∞ | | | |

| Variable | Focal Length | | |
|---|---|---|---|
| Separation | 4.40 | 7.50 | 11.00 |
| D 2 | 1.10 | 3.32 | 2.36 |
| D 6 | 7.65 | 2.39 | 0.80 |
| D11 | 0.70 | 1.75 | 2.70 |
| D13 | 2.80 | 1.75 | 0.80 |
| D15 | 0.80 | 3.84 | 6.38 |

Aspheric Coefficients:

| | | | |
|---|---|---|---|
| R 5: | k = 0.00000e+00 | A = 0 | B = 6.49090e−04 |
| | C = 7.17480e−05 | D = −4.90624e−06 | E = 4.28163e−07 |
| R15: | k = 0.00000e+00 | A = 0 | B = 2.48016e−03 |
| | C = 2.67010e+04 | D = −5.54809e−05 | E = 4.70090e−06 |

Numerical Example 6:

| | | | |
|---|---|---|---|
| f = 4.10~11.90 | Fno = 2.80~5.1 | 2ω = 75.9° ~30.1° | |
| R 1 = 14.611 | D 1 = 1.00 | N 1 = 1.615706 | ν 1 = 59.3 |
| R 2 = 7.441 | D 2 = Variable | | |
| R 3 = 18.502 | D 3 = 1.00 | N 2 = 1.681771 | ν 2 = 56.1 |
| R 4 = 4.101 | D 4 = 1.23 | | |
| *R 5 = 7.347 | D 5 = 1.54 | N 3 = 1.847000 | ν 3 = 23.8 |
| R 6 = 8.024 | D 6 = Variable | | |
| R 7 = 14.161 | D 7 = 1.53 | N 4 = 1.493392 | ν 4 = 69.6 |
| R 8 = −9.458 | D 8 = 0.20 | | |
| R 9 = 5.043 | D 9 = 1.54 | N 5 = 1.487000 | ν 5 = 70.4 |
| R10 = 51.806 | D10 = 0.70 | | |
| R11 = Stop | D11 = Variable | | |
| R12 = −12.871 | D12 = 1.00 | N 6 = 1.787723 | ν 6 = 26.1 |
| R13 = 13.916 | D13 = Variable | | |
| R14 = 6.224 | D14 = 1.52 | N 7 = 1.583126 | ν 7 = 59.4 |
| *R15 = −176.009 | D15 = Variable | | |
| R16 = ∞ | D16 = 3.00 | N 8 = 1.516330 | ν 8 = 64.2 |
| R17 = ∞ | | | |

-continued

| Variable | Focal Length | | |
|---|---|---|---|
| Separation | 4.10 | 8.50 | 11.90 |
| D 2 | 1.58 | 4.3& | 3.14 |
| D 6 | 8.83 | 1.98 | 0.80 |
| D11 | 0.70 | 2.28 | 3.20 |
| D13 | 3.30 | 1.72 | 0.80 |
| D15 | 0.80 | 4.93 | 7.27 |

Aspheric Coefficients:

R 5: k = 0.00000e+00   A = 0              B = 5.08068e−04
     C = 6.09870e−05   D = −3.56496e−06   E = 2.56696e−07
R15: k = 0.00000e+00   A = 0              B = 2.31400e−03
     C = 1.28871e−04   D = −2.61705e−05   E = 2.00178e−06

Numerical Example 7:

f = 4.31~11.07   Fno = 2.80~4.6   2ω = 73.2° ~32.2°
R 1 = 15.162    D 1 = 1.00        N 1 = 1.525479   ν 1 = 66.1
R 2 = 6.880     D 2 = Variable
R 3 = 18.453    D 3 = 1.00        N 2 = 1.697000   ν 2 = 55.5
R 4 = 4.373     D 4 = 1.24
*R 5 = 8.151    D 5 = 1.45        N 3 = 1.847000   ν 3 = 23.8
R 6 = 9.729     D 6 = Variable
R 7 = 15.609    D 7 = 1.47        N 4 = 1.493670   ν 4 = 69.6
R 8 = −9.984    D 8 = 0.20
R 9 = 4.988     D 9 = 1.46        N 5 = 1.500343   ν 5 = 68.8
R10 = 30.440    D10 = 0.70
R11 = Stop      D11 = Variable
R12 = −16.597   D12 = 1.00        N 6 = 1.830259   ν 6 = 26.8
R13 = 14.364    D13 = Variable
R14 = 8.591     D14 = 1.49        N 7 = 1.583126   ν 7 = 59.4
*R15 = −9.222   D15 = 0.84
R16 = −4.325    D16 = 1.18        N 8 = 1.847000   ν 8 = 23.8
R17 = −5.692    D17 = Variable
R18 = ∞         D18 = 3.00        N 9 = 1.516330   ν 9 = 64.2
R19 = ∞

| Variable | Focal Length | | |
|---|---|---|---|
| Separation | 4.31 | 7.45 | 11.07 |
| D 2 | 1.73 | 4.77 | 3.93 |
| D 6 | 8.97 | 2.71 | 0.80 |
| D11 | 0.70 | 1.74 | 2.70 |
| D13 | 2.20 | 1.16 | 0.20 |
| D17 | 0.80 | 4.02 | 6.77 |

Aspheric Coefficients:

R 5: k = 0.00000e+00    A = 0              B = 4.67167e−04
     C = 4.28221e−05    D = −2.21266e−06   E = 1.51236e−07
R15: k = 0.00000e+00    A = 0              B = 1.45364e−03
     C = −1.39989e−05   D = 4.64898e−06    E = −4.92888e−07

TABLE 2

| | Numerical Example | | |
|---|---|---|---|
| Condition | 4 | 5 | 6 |
| (4) (d2w−d2t)/(d4w−d4t) | 3.43 | 3.21 | 4.09 |
| (5) d4w/d4t | 3.50 | 4.13 | 11.0 |
| (6) d1w/d1t | 0.47 | 0.50 | 0.44 |

It will be appreciated from the foregoing that, according to the second embodiment disclosed as applied to the negative lead type of zoom lens, with five lens units in total, the refractive powers of all the lens units and the relations in which adjacent two of the lens units move during zooming are appropriately determined to improve the compact form of the entire lens system. It is, therefore, made possible Lo achieve a zoom lens whose field angle for the wide-angle end is 70° or wider and range is 2.5–3 or thereabout, and which has a high optical performance over the entire zooming range.

(Third Embodiment)

Next, using FIGS. 29A to 29C through FIGS. 48A to 48D, a third embodiment (numerical examples 8 to 12) of the invention is described below.

FIGS. 29A to 29C through FIGS. 33A to 33C in block diagram show the numerical examples 8 to 12, whose data will be described later. FIGS. 34A to 34D through FIGS. 36A to 36D show the aberrations of the numerical example 8 of the zoom lens at the wide-angle end, a middle focal length position and the telephoto end, respectively. FIGS. 37A to 37D through FIGS. 39A to 39D show the aberrations of the numerical example 9 of the zoom lens at the wide-angle end, a middle focal length position and the telephoto end, respectively. FIGS. 40A to 40D through FIGS. 42A to 42D show the aberrations of the numerical example 10 of the zoom lens at the wide-angle end, a middle focal length position and the telephoto end, respectively. FIGS. 43A to 43D through FIGS. 45A to 45D show the aberrations of the numerical example 11 of the zoom lens at the wide-angle end, a middle focal length position and the telephoto end, respectively. FIGS. 46A to 46D through FIGS. 48A to 48D show the aberrations of the numerical example 12 of the zoom lens at the wide-angle end, a middle focal length position and the telephoto end, respectively.

Of the lens block diagrams, the ones of figure numbers with suffix "A" are at the wide-angle end, the ones of figure numbers with suffix "B" in a middle focal length position and the ones of figure numbers with suffix "C" at the telephoto end.

The zoom lens comprises, in order from the object side, a first lens unit L1 of negative refractive power, a second lens unit L2 of positive refractive power, a third lens unit L3 of positive refractive power and a fourth lens unit L4 of positive refractive power. A stop is indicated at SP. A glass block G such as a filter lies in front of an image plane IP.

In the zoom lens of the third embodiment, a basic arrangement is made such that, during zooming from the wide-angle end to the telephoto end, the air separation between the first and second lens units decreases, and the air separation between the second and third lens units decreases, wherein the first lens unit axially moves in a locus convex toward the image side, and the second and third lens units each axially move toward the object side either linearly or non-linearly as indicated by the arrows.

The zoom lens of the third embodiment has a characteristic feature that the third lens unit is constructed with one positive lens. In particular, the rear surface of the positive lens in the third lens unit is formed to an aspheric shape.

Another characteristic feature is that the second lens unit is composed of positive and negative lenses, or two lenses in total. In particular, the stop SP is provided at the second lens unit, and, during zooming, axially moves together with the second lens unit. Yet another feature is that a negative lens included in the second lens unit has a front surface whose radius of curvature $R2_{n1}$ lies in the following range:

$$-2 < R2_{n1}/fW < -0.5 \tag{7}$$

where fW is the focal length in the wide-angle end of the entire lens system.

By satisfying the condition (7), coma flare is corrected well over the entire zooming range. More preferably, the numerical range of the condition (7) is narrowed to:

$$-1.4 < R2_{n1}/fw < -0.9 \quad (7a)$$

A furthermore characteristic feature is that the first and third lens units have aspheric surfaces. In particular, the first lens unit includes at least one positive lens and at least one negative lens.

There is even another feature that, letting the separations at the wide-angle end and the telephoto end between the first and second lens units be denoted by D12W and D12T, respectively, and the separations at the wide-angle end and the telephoto end between the second and third lens units be denoted by D23W and D23T, respectively, the following condition is satisfied:

$$2.5 < (D12W-D12T)/(D23W-D23T) < 20 \quad (8)$$

The inequalities of condition (8) give an appropriate range for the ratio of the zooming movements of all the lens units to minimize the variation of the position of the exit pupil with zooming and have an aim to maintain the image quality over the entire area of the frame stable against zooming. This is because, in application of the invention to the zoom lens in, for example, the electronic still camera, the principal ray of the off-axial beam has, despite zooming, to always hold a certain condition as it impinges on the CCD or like sensor.

When the upper limit of the condition (8) is exceeded, as the variation of the separation between the second and third lens units decreases, the change of the position of the exit pupil increases objectionably.

When the variation of the separation between the first and second lens units decreases from the lower limit, it becomes difficult to secure the air spaces necessary for the required zooming movements of all the lens units for a certain zoom ratio.

More preferably, the condition (8) is altered as follows:

$$4.0 < (D12W-D12T)/(D23W-D23T) < 15 \quad (8a)$$

Next, each of the numerical examples 8 to 12 is described in connection with the form and the construction and arrangement of the constituent lenses. In the numerical example 8 shown in FIGS. 29A to 29C, the first lens unit L1 is constructed from a negative lens having a concave surface facing the image side and a positive lens having a convex surface facing the object side, or two lenses in total, the second lens unit L2 is constructed from a positive lens of bi-convex form and a negative lens having a concave surface facing the object side, or two lenses in total, the third lens unit L3 is constructed from a positive lens of bi-convex form, or one lens in total, and the fourth lens unit L4 is constructed from a positive lens having a convex surface facing the object side, or one lens in total. The fourth lens unit remains stationary during zooming. A stop SP is positioned on the image side of the second lens unit and arranged on zooming to move together with the second lens unit.

Figure 30A:
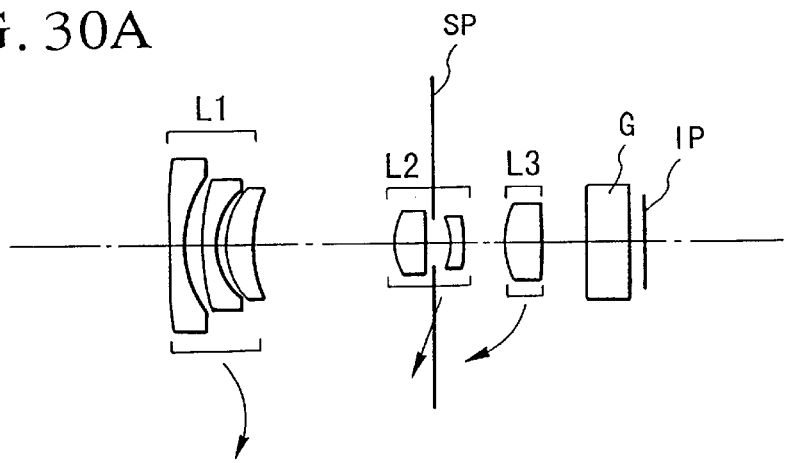
FIGS. 30A to 30C are longitudinal section views of a numerical example 9 of the zoom lens in three operative positions.
Figure 30B:
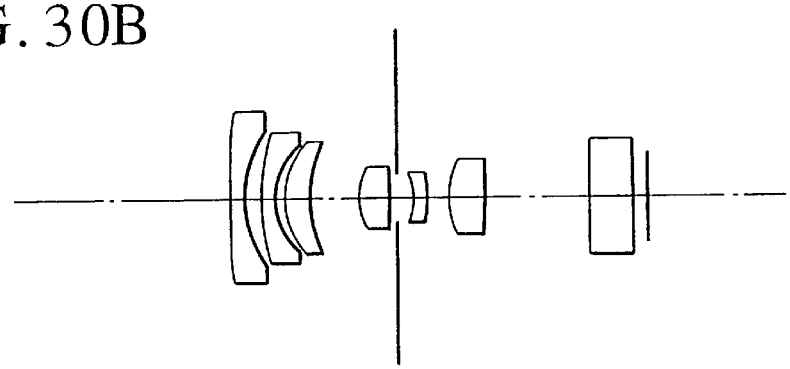
Figure 30C:
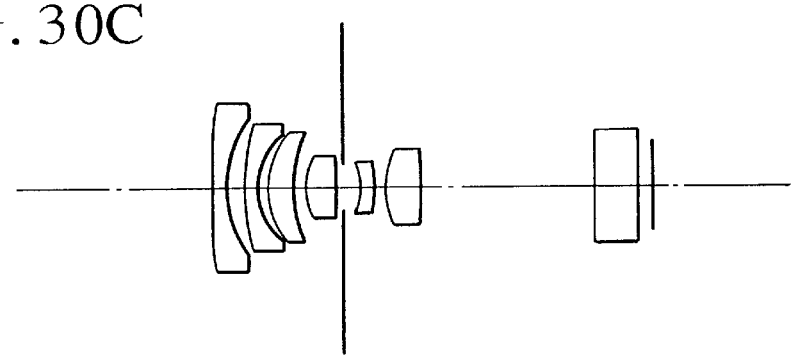
Figure 31A:
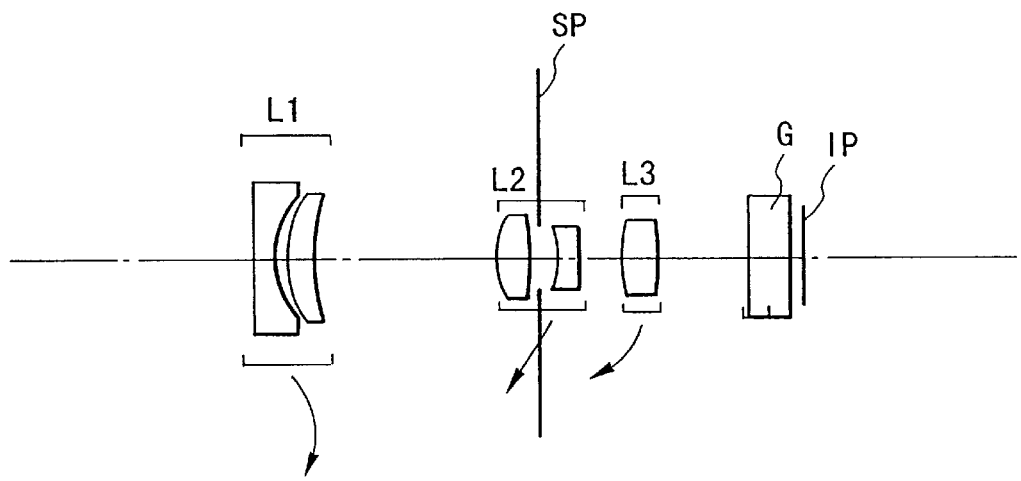
FIGS. 31A to 31C are longitudinal section views of a numerical example 10 of the zoom lens in three operative positions.
Figure 31B:
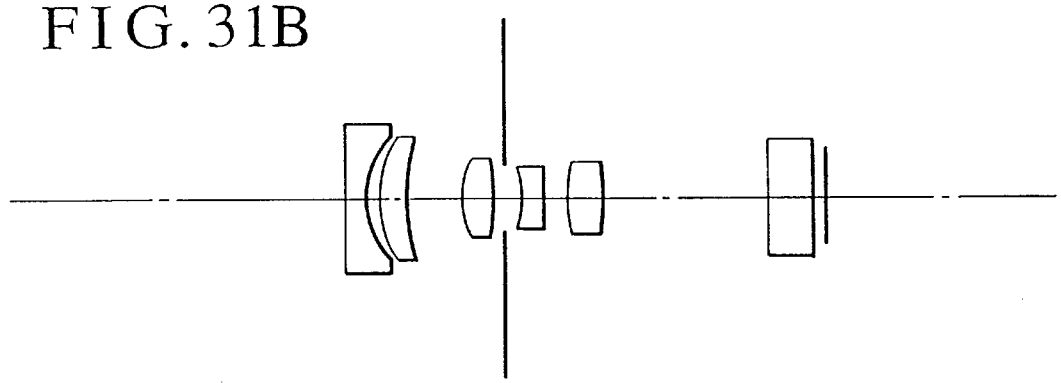
Figure 31C:
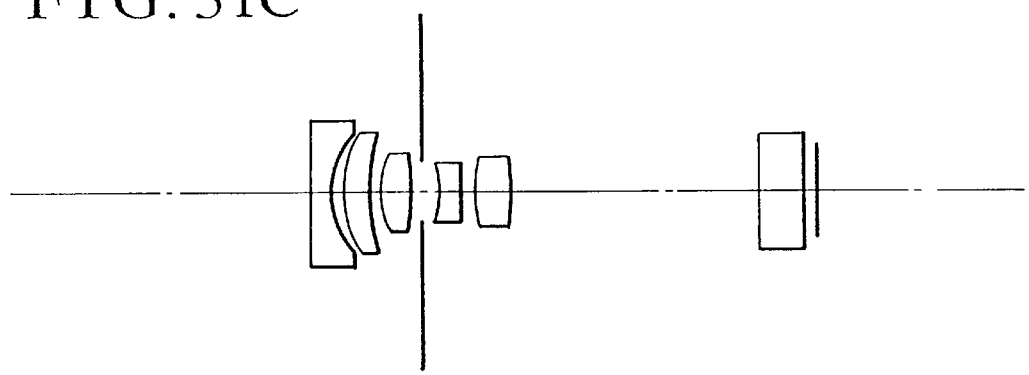
Figure 32A:
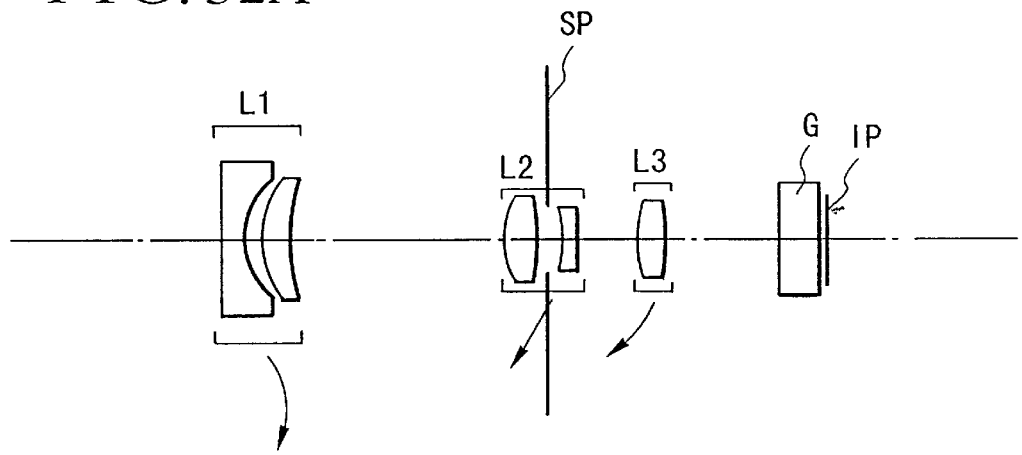
FIGS. 32A to 32C are longitudinal section views of a numerical example 11 of the zoom lens in three operative positions.
Figure 32B:
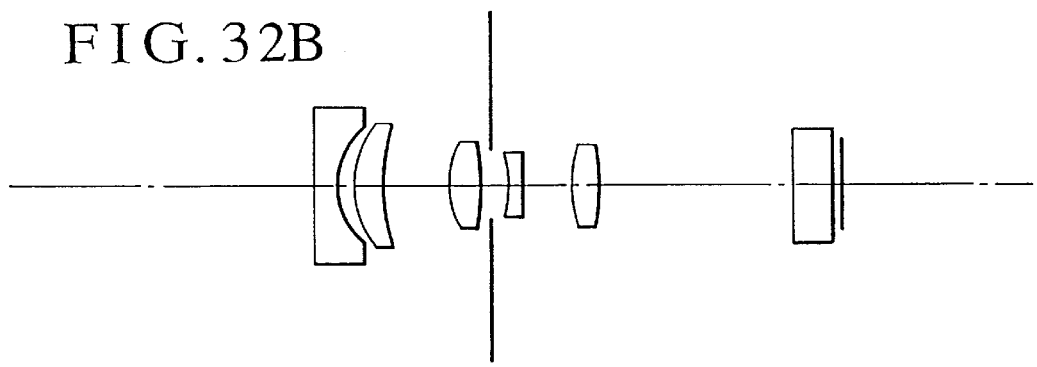
Figure 32C:
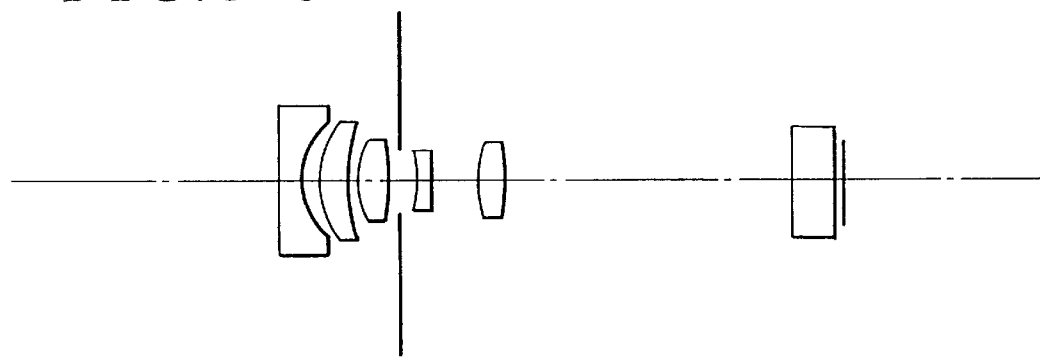

In the numerical example 9 shown in FIGS. 30A to 30C, the first lens unit L1 is constructed from two negative lenses having concave surfaces facing the image side, and a positive lens having a convex surface facing the object side, or three lenses in total, the second lens unit L2 is constructed from a positive lens of bi-convex form and a negative lens having a concave surface facing the object side, or two lenses in total, and the third lens unit L3 is constructed from a positive lens of bi-convex form, or one lens in total. A stop SP is positioned in the space between the positive and negative lenses of the second lens unit, and, during zooming, moves together with the second lens unit.

In the numerical examples 10 and 11 shown in FIGS. 31A to 31C and FIGS. 32A to 32C, the first lens unit L1 is constructed from a negative lens having a concave surface facing the image side and a positive lens having a convex surface facing the object side, or two lenses in total, the second lens unit L2 is constructed from a positive lens of bi-convex form and a negative lens having a concave surface facing the object side, or two lenses in total, and the third lens unit L3 is constructed from a positive lens of bi-convex form, or one lens in total. A stop SP is positioned in the space between the positive and negative lenses of the second lens unit, and, during zooming, moves together with the second lens unit.

Figure 33A:
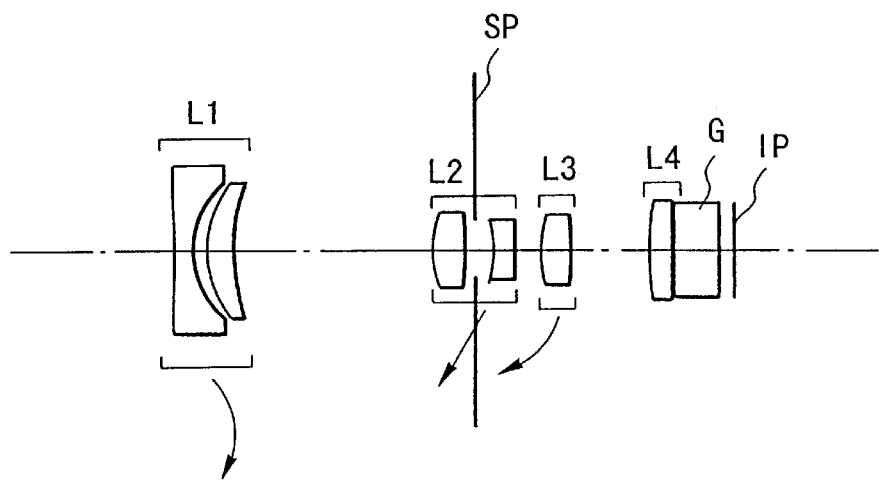
FIGS. 33A to 33C are longitudinal section views of a numerical example 12 of the zoom lens in three operative positions.
Figure 33B:
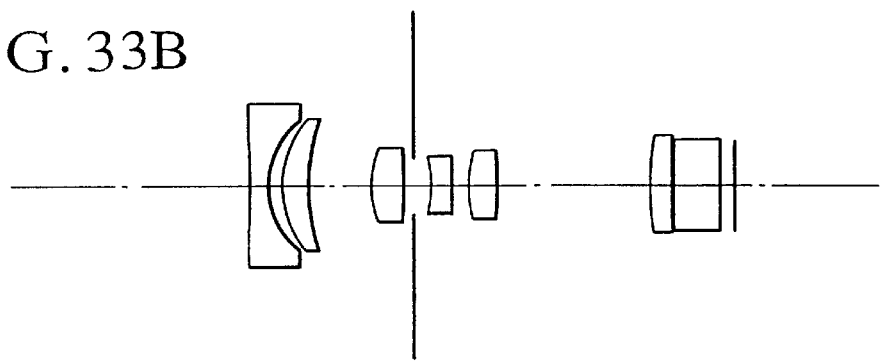
Figure 33C:
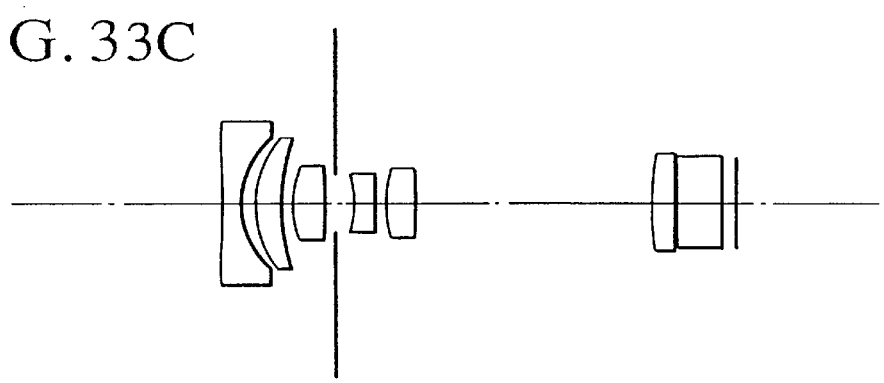
Figures 34A, 34B, 34C, 34D:
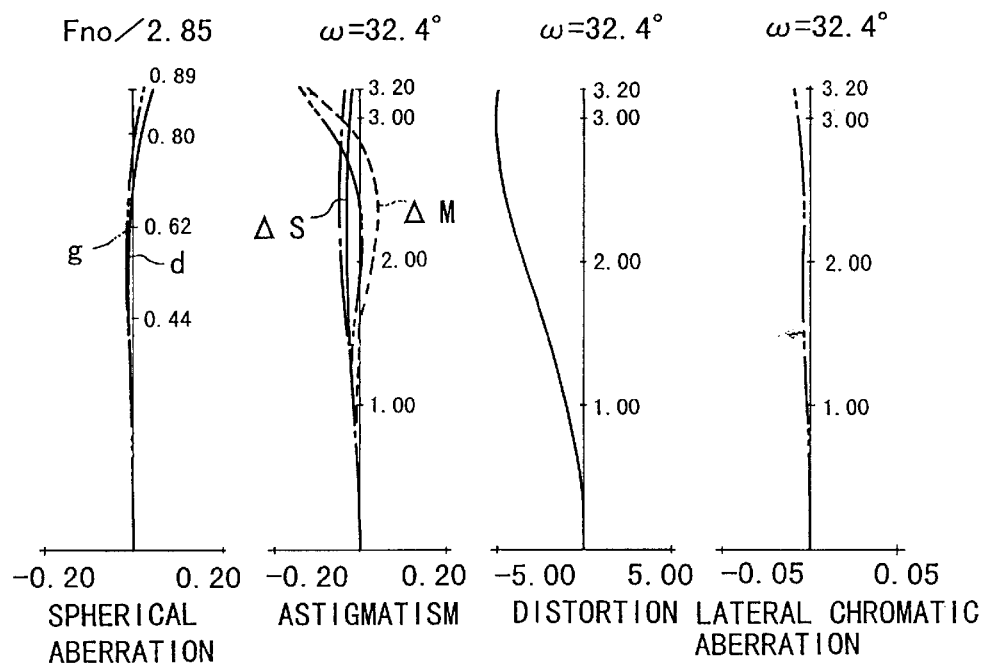
FIGS. 34A to 34D are graphic representations of the aberrations of the numerical example 8 of the zoom lens at the wide-angle end.
Figures 35A, 35B, 35C, 35D:
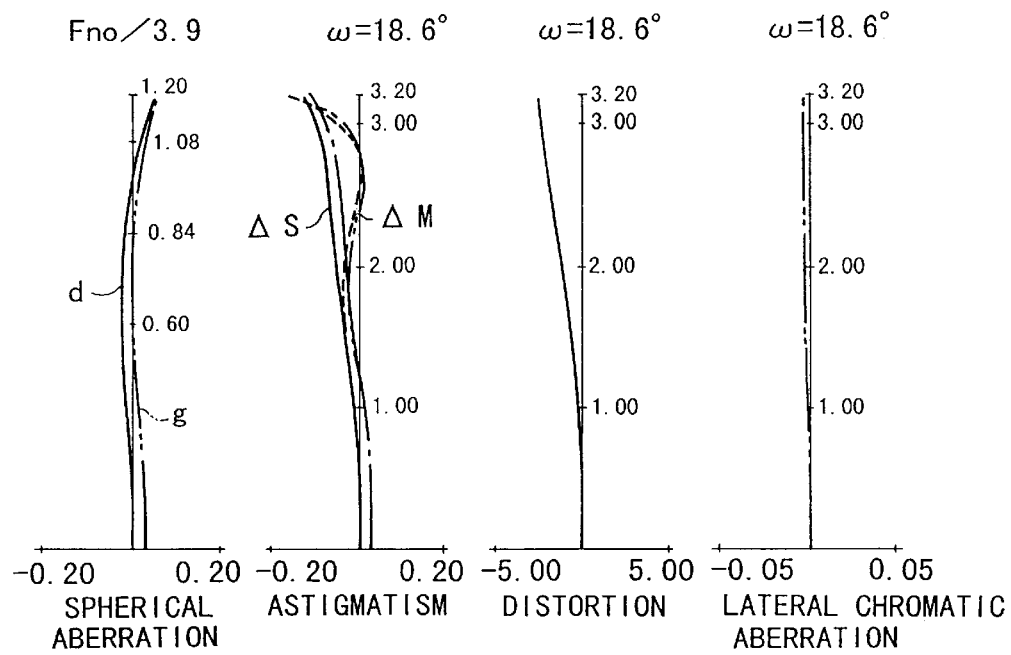
FIGS. 35A to 35D are graphic representations of the aberrations of the numerical example 8 of the zoom lens in a middle focal length position.
Figures 36A, 36B, 36C, 36D:
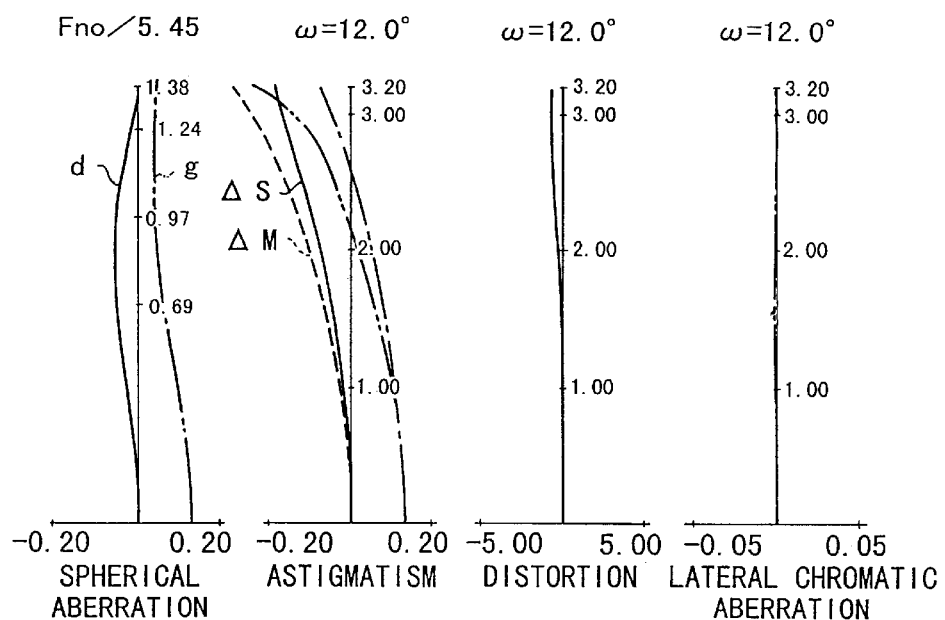
FIGS. 36A to 36D are graphic representations of the aberrations of the numerical example 8 of the zoom lens at the telephoto end.
Figures 37A, 37B, 37C, 37D:
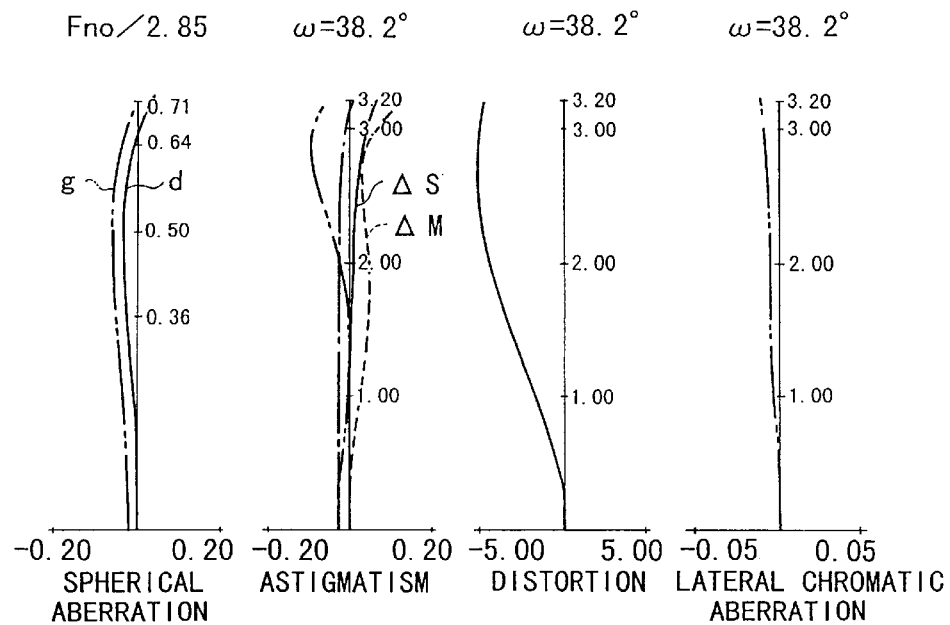
FIGS. 37A to 37D are graphic representations of the aberrations of the numerical example 9 of the zoom lens in the wide-angle end.
Figures 38A, 38B, 38C, 38D:
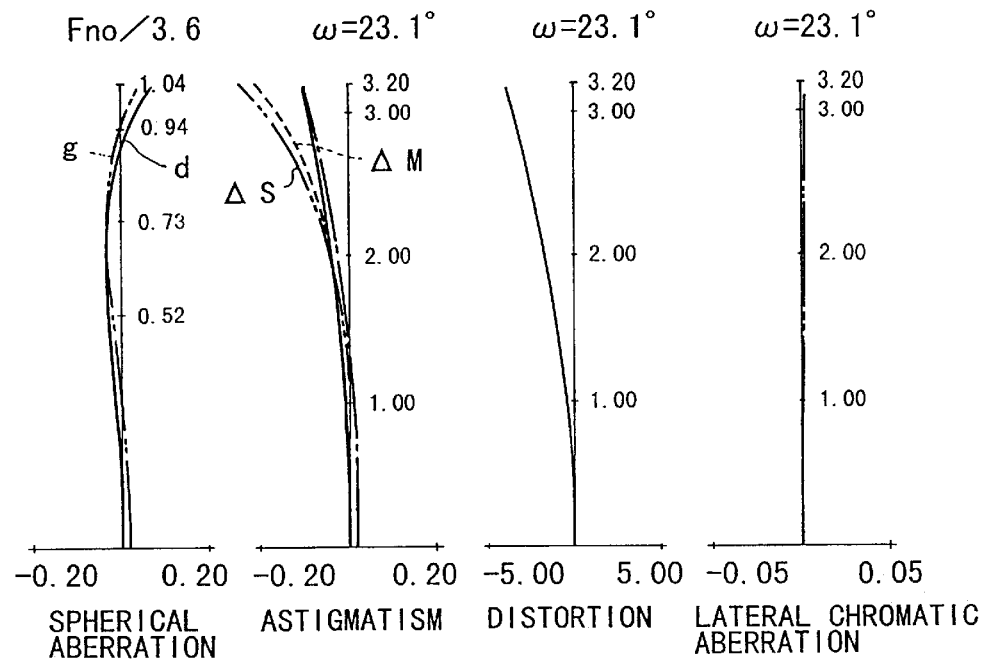
FIGS. 38A to 38D are graphic representations of the aberrations of the numerical example 9 of the zoom lens in a middle focal length position.
Figures 39A, 39B, 39C, 39D:
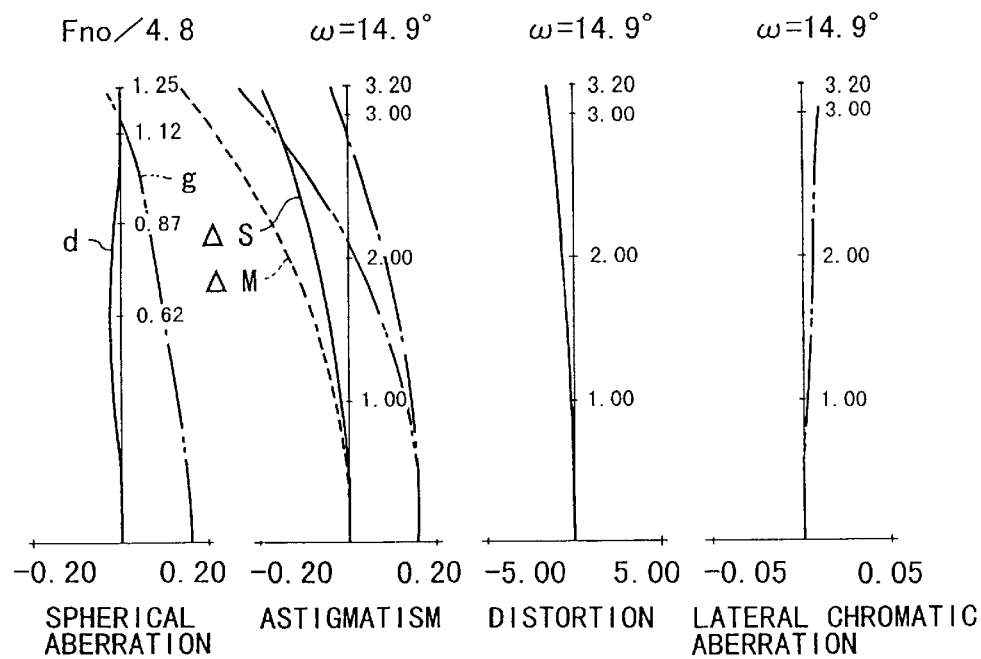
FIGS. 39A to 39D are graphic representations of the aberrations of the numerical example 9 of the zoom lens at the telephoto end.
Figures 40A, 40B, 40C, 40D:
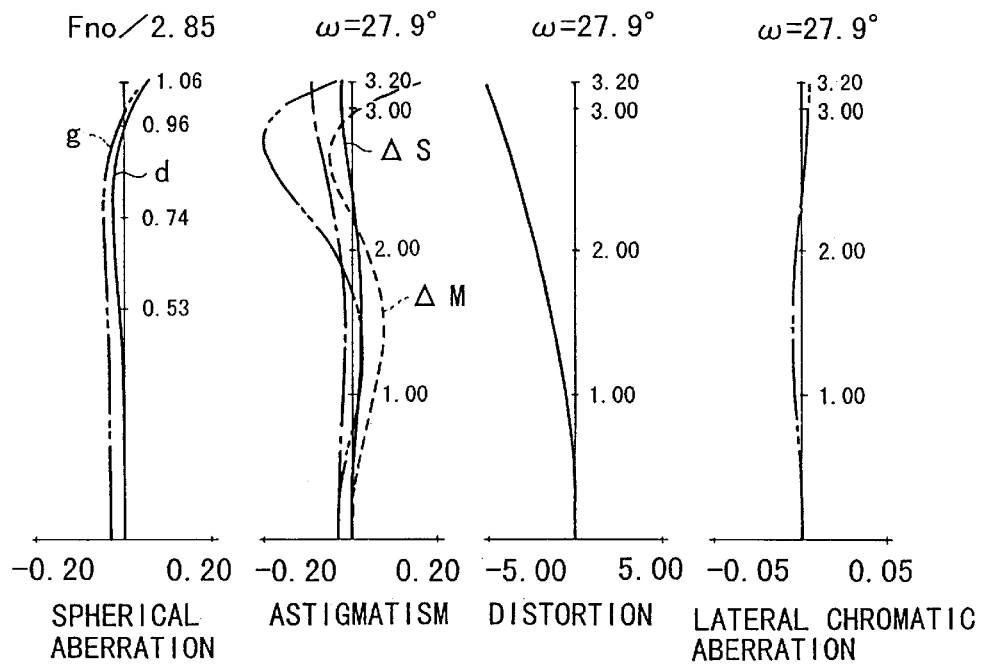
FIGS. 40A to 40D are graphic representations of the aberrations of the numerical example 10 of the zoom lens at the wide-angle end.
Figures 41A, 41B, 41C, 41D:
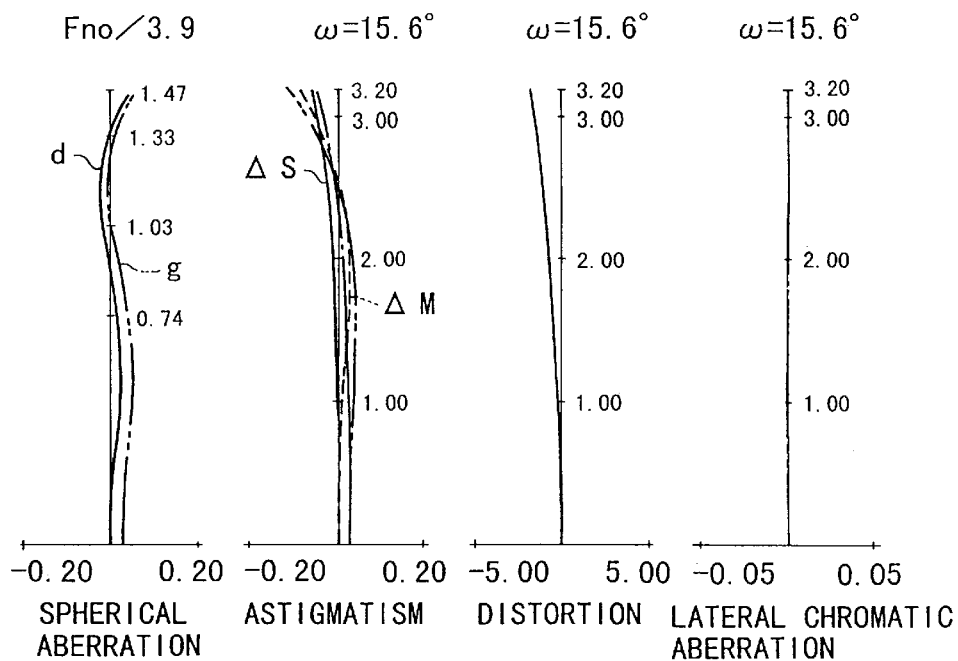
FIGS. 41A to 41D are graphic representations of the aberrations of the numerical example 10 of the zoom lens in a middle focal length position.
Figures 42A, 42B, 42C, 42D:
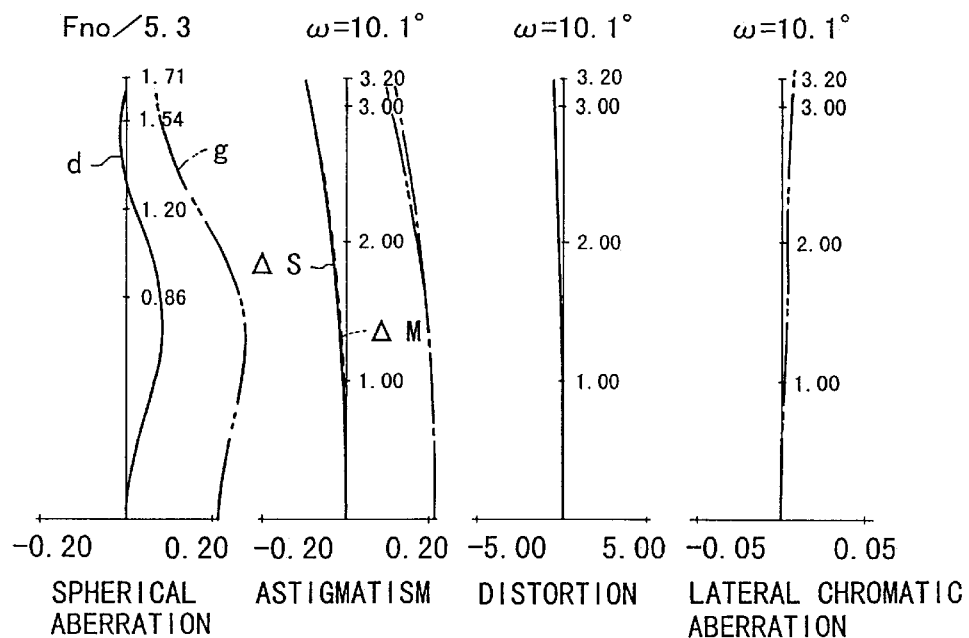
FIGS. 42A to 42D are graphic representations of the aberrations of the numerical example 10 of the zoom lens at the telephoto end.
Figures 43A, 43B, 43C, 43D:
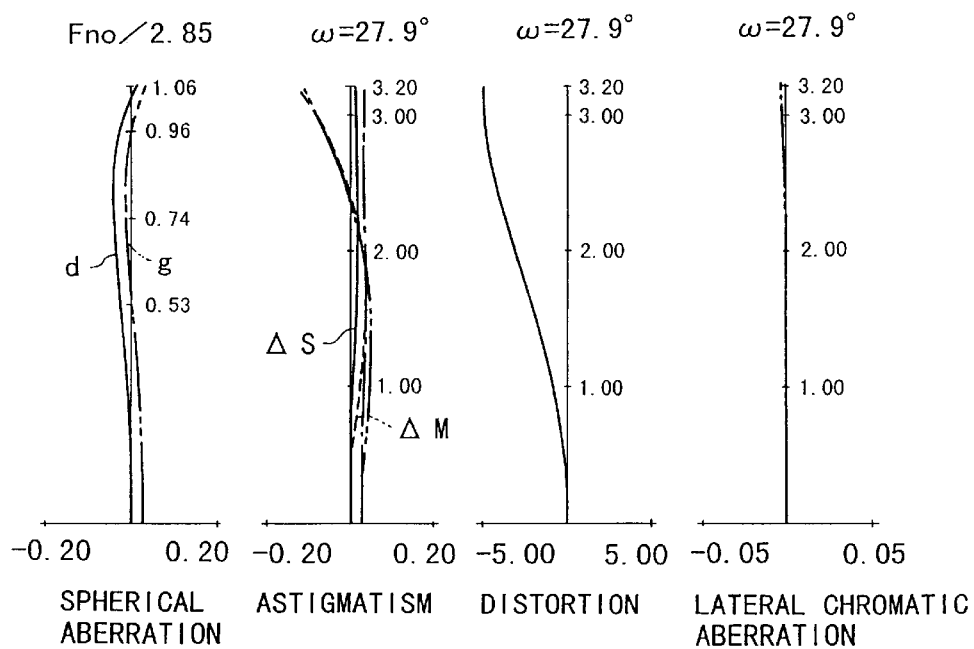
FIGS. 43A to 43D are graphic representations of the aberrations of the numerical example 11 of the zoom lens at the wide-angle end.
Figures 44A, 44B, 44C, 44D:
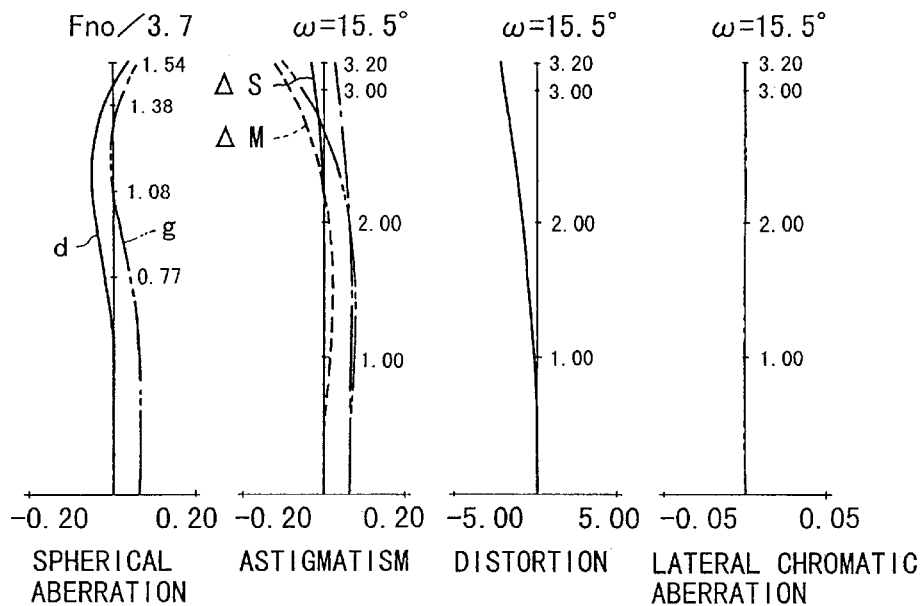
FIGS. 44A to 44D are graphic representations of the aberrations of the numerical example 11 of the zoom lens in a middle focal length position.
Figures 45A, 45B, 45C, 45D:
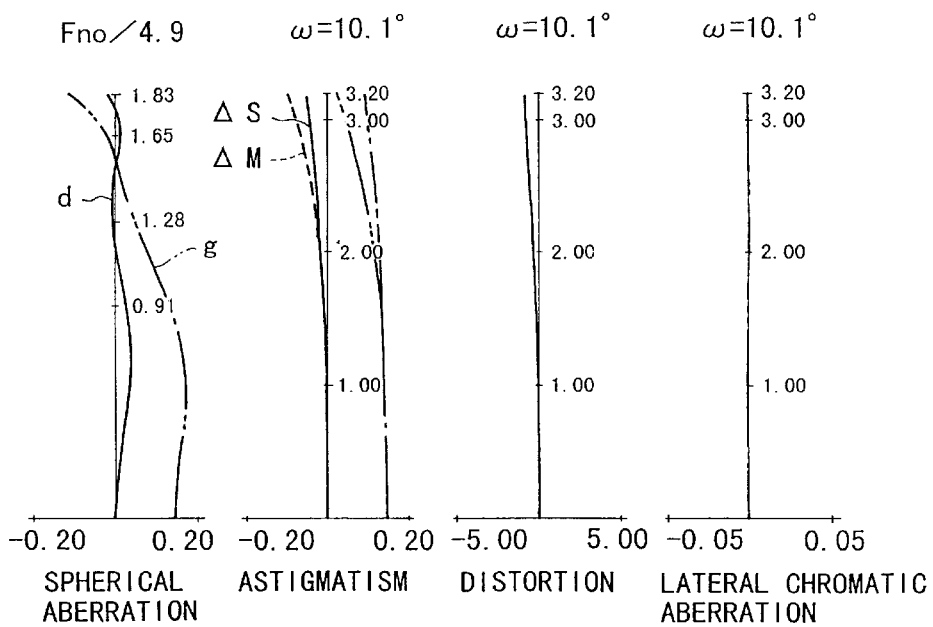
FIGS. 45A to 45D are graphic representations of the aberrations of the numerical example 11 of the zoom lens at the telephoto end.
Figures 46A, 46B, 46C, 46D:
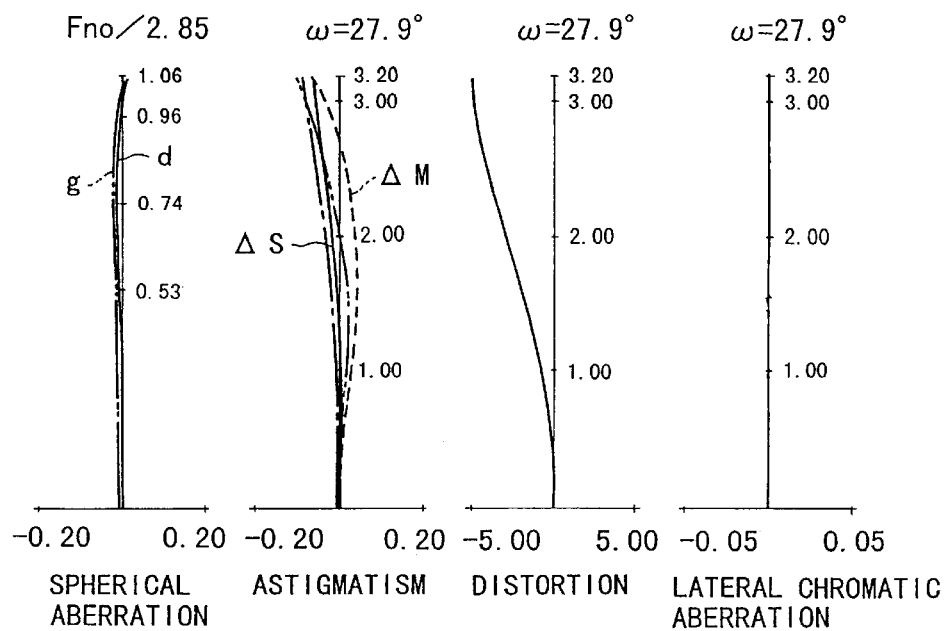
FIGS. 46A to 46D are graphic representations of the aberrations of the numerical example 12 of the zoom lens at the wide-angle end.
Figures 47A, 47B, 47C, 47D:
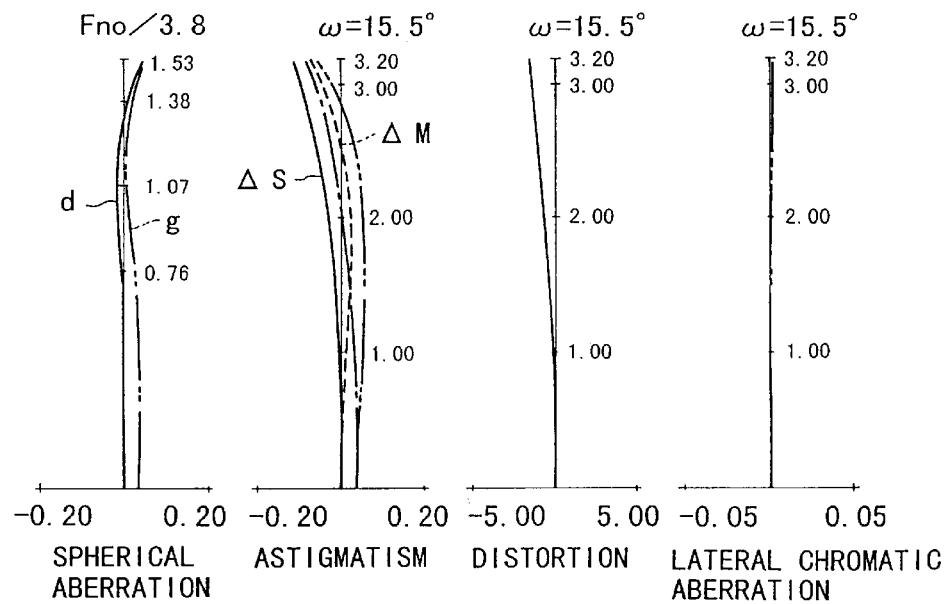
FIGS. 47A to 47D are graphic representations of the aberrations of the numerical example 12 of the zoom lens in a middle focal length position.
Figures 48A, 48B, 48C, 48D:
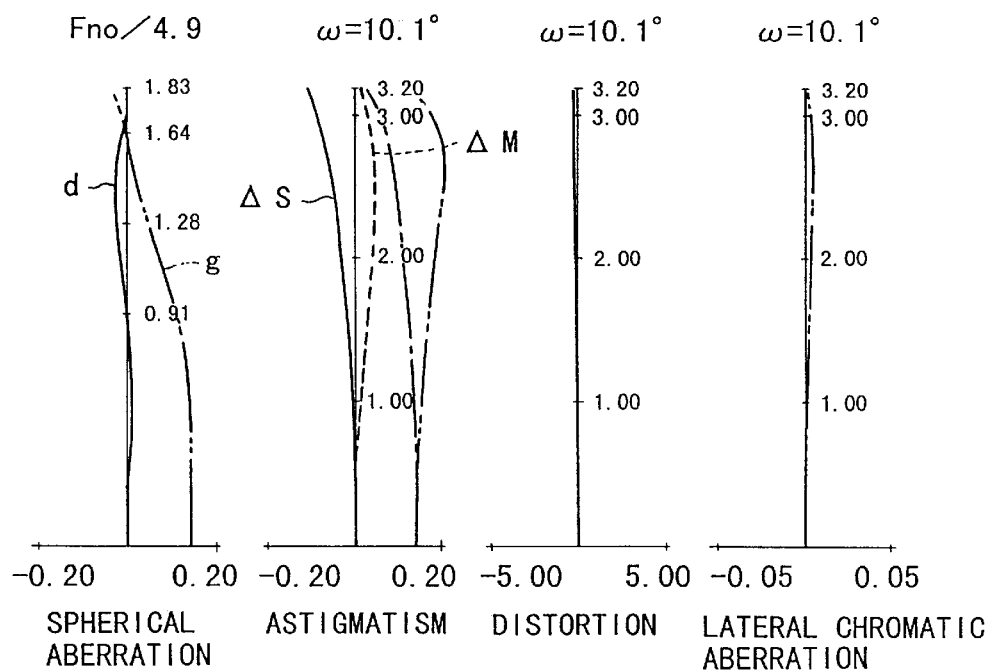
FIGS. 48A to 48D are graphic representations of the aberrations of the numerical example 12 of the zoom lens at the telephoto end.

In the numerical example 12 shown in FIGS. 33A to 33C, the first lens unit L1 is constructed from a negative lens having a concave surface facing the image side and a positive lens having a convex surface facing the object side, or two lenses in total, the second lens unit L2 is constructed from a positive lens of bi-convex form and a negative lens having a concave surface facing the object side, or two lenses in total, the third lens unit L3 is constructed from a positive lens of bi-convex form, or one lens in total, and the fourth lens unit L4 is constructed from a positive lens having a convex surface facing the object side, or one lens in total. The fourth lens unit remains stationary during zooming. A stop SP is positioned in the space between the positive and negative lenses of the second lens unit, and, during zooming, moves together with the second lens unit.

Next, the numerical data for the examples 8 to 12 of the third embodiment are shown in tables below. The values of the factors in the above-described conditions (7) and (8) for the numerical examples 8 to 12 are listed in Table-3.

Numerical Example 8:

f = 5.05~15.03　Fno = 2.85~5.45　$2\omega$ = 64.7° ~24.0°

| | | | |
|---|---|---|---|
| *R 1 = −30.405 | D 1 = 1.30 | N 1 = 1.728740 | ν 1 = 49.2 |
| R 2 = 5.500 | D 2 = 1.08 | | |
| R 3 = 7.258 | D 3 = 1.80 | N 2 = 1.847000 | ν 2 = 23.8 |
| R 4 = 13.000 | D 4 = Variable | | |
| R 5 = 6.388 | D 5 = 2.20 | N 3 = 1.697000 | ν 3 = 55.5 |
| R 6 = −16.855 | D 6 = 1.95 | | |
| R 7 = −5.458 | D 7 = 1.00 | N 4 = 1.846659 | ν 4 = 23.8 |
| R 8 = −57.388 | D 8 = 0.80 | | |
| R 9 = Stop | D 9 = Variable | | |
| R10 = 11.340 | D10 = 1.50 | N 5 = 1.583126 | ν 5 = 59.4 |
| *R11 = −15.429 | D11 = Variable | | |
| R12 = 13.732 | D12 = 1.50 | N 6 = 1.487000 | ν 6 = 70.4 |
| R13 = ∞ | D13 = 0.20 | | |
| R14 = ∞ | D14 = 3.00 | N 7 = 1.516330 | ν 7 = 64.2 |
| R15 = ∞ | | | |

| Variable | Focal Length | | |
|---|---|---|---|
| Separation | 5.05 | 9.50 | 15.03 |
| D 4 | 13.50 | 4.16 | 0.80 |
| D 9 | 4.11 | 2.88 | 2.11 |
| D11 | 4.28 | 10.24 | 16.97 |

Aspheric Coefficients:

| | | | |
|---|---|---|---|
| R 1: | k = 0.00000e+00 | A = 0 | B = 3.67661e−04 |
| | C = −1.62836e−06 | D = 4.29338e−08 | E = −3.49687e−10 |
| R11: | k = 0.00000e+00 | A = 0 | B = 5.78942e−04 |
| | C = 6.97475e−05 | D = −1.16748e−05 | E = 7.07112e−07 |

Numerical Example 9:

f = 4.06~11.99　Fno = 2.85~4.80　$2\omega$ = 76.5° ~29.9°

| | | | |
|---|---|---|---|
| *R 1 = −100.000 | D 1 = 1.00 | N 1 = 1.665320 | ν 1 = 55.4 |
| R 2 = 8.505 | D 2 = 1.15 | | |

-continued

| | | | |
|---|---|---|---|
| R 3 = 15.821 | D 3 = 1.00 | N 2 = 1.860657 | ν 2 = 42.0 |
| R 4 = 4.875 | D 4 = 0.70 | | |
| R 5 = 5.661 | D 5 = 2.00 | N 3 = 1.847000 | ν 3 = 23.8 |
| R 6 = 10.000 | D 6 = Variable | | |
| R 7 = 4.475 | D 7 = 2.20 | N 4 = 1.603112 | ν 4 = 60.7 |
| R 8 = −22.873 | D 8 = 0.50 | | |
| R 9 = Stop | D 9 = 1.20 | | |
| R10 = −4.034 | D10 = 1.00 | N 5 = 1.847000 | ν 5 = 23.8 |
| R11 = −10.445 | D11 = Variable | | |
| R12 = 5.711 | D12 = 2.50 | N 6 = 1.517277 | ν 6 = 69.6 |
| *R13 = −26.000 | D13 = Variable | | |
| R14 = ∞ | D14 = 3.00 | N 7 = 1.516330 | ν 7 = 64.2 |
| R15 = ∞ | | | |

| Variable | Focal Length | | |
|---|---|---|---|
| Separation | 4.06 | 7.49 | 11.99 |
| D 6 | 10.11 | 3.36 | 0.80 |
| D11 | 2.80 | 1.50 | 0.80 |
| D13 | 3.16 | 7.28 | 12.09 |

Aspheric Coefficients:

| | | | |
|---|---|---|---|
| R 1: | k = 0.00000e+00 | A = 0 | B = 2.34142e−04 |
| | C = 7.67426e−06 | D = −2.56088e−07 | E = 2.79309e−09 |
| R13: | k = 0.00000e+00 | A = 0 | B = 2.78101e−03 |
| | C = 2.02895e−04 | D = −2.75199e−05 | E = 1.78365e−06 |

Numerical Example 10:

f = 6.06~18.01   Fno = 2.85~5.26   2ω = 55.7° ~20.2°

| | | | |
|---|---|---|---|
| R 1 = −161.459 | D 1 = 1.30 | N 1 = 1.738266 | ν 1 = 50.7 |
| R 2 = 5.716 | D 2 = 0.91 | | |
| *R 3 = 8.211 | D 3 = 1.80 | N 2 = 1.848578 | ν 2 = 24.3 |
| R 4 = 13.000 | D 4 = Variable | | |
| R 5 = 5.717 | D 5 = 2.20 | N 3 = 1.624997 | ν 3 = 58.8 |
| R 6 = −45.271 | D 6 = 0.80 | | |
| R 7 = Stop | D 7 = 1.20 | | |
| R 8 = −6.178 | D 8 = 1.50 | N 4 = 1.846659 | ν 4 = 23.8 |
| R 9 = −22.530 | D 9 = Variable | | |
| R10 = 9.008 | D10 = 2.50 | N 5 = 1.583126 | ν 5 = 59.4 |
| *R11 = −25.000 | D11 = Variable | | |
| R12 = ∞ | D12 = 3.00 | N 6 = 1.516330 | ν 6 = 64.2 |
| R13 = ∞ | | | |

| Variable | Focal Length | | |
|---|---|---|---|
| Separation | 6.06 | 11.49 | 18.01 |
| D 4 | 12.71 | 3.92 | 0.80 |
| D 9 | 2.80 | 1.56 | 0.80 |
| D11 | 6.22 | 11.39 | 17.12 |

Aspheric Coefficients:

| | | | |
|---|---|---|---|
| R 3: | k = 0.00000e+00 | A = 0 | B = 2.62463e−04 |
| | C = 1.06080e−05 | D = 9.71387e−08 | E = −1.52620e−09 |
| R11: | k = 0.00000e+00 | A = 0 | B = 1.43670e−03 |
| | C = −1.76772e−04 | D = 4.93570e−05 | E = −4.16761e−06 |

Numerical Example 11:

f = 6.05~17.93   Fno = 2.85~4.90   2ω = 55.8° ~20.2°

| | | | |
|---|---|---|---|
| *R 1 = −56.510 | D 1 = 1.50 | N 1 = 1.728740 | ν 1 = 49.2 |
| R 2 = 5.501 | D 2 = 1.33 | | |
| R 3 = 7.503 | D 3 = 1.90 | N 2 = 1.847000 | ν 2 = 23.8 |
| R 4 = 13.000 | D 4 = Variable | | |
| R 5 = 6.857 | D 5 = 2.30 | N 3 = 1.656555 | ν 3 = 56.4 |
| R 6 = −19.132 | D 6 = 0.80 | | |
| R 7 = Stop | D 7 = 1.20 | | |
| R 8 = −6.803 | D 8 = 1.00 | N 4 = 1.846659 | ν 4 = 23.8 |
| R 9 = −370.128 | D 9 = Variable | | |
| R10 = 10.398 | D10 = 2.00 | N 5 = 1.583126 | ν 5 = 59.4 |
| *R11 = −19.026 | D11 = Variable | | |
| R12 = ∞ | D12 = 3.00 | N 6 = 1.516330 | ν 6 = 64.2 |
| R13 = ∞ | | | |

| Variable | Focal Length | | |
|---|---|---|---|
| Separation | 6.05 | 11.50 | 17.93 |
| D 4 | 15.33 | 4.75 | 0.80 |
| D 9 | 4.42 | 3.61 | 3.25 |
| D11 | 7.90 | 13.84 | 20.60 |

Aspheric Coefficients:

| | | | |
|---|---|---|---|
| R 1: | k = 0.00000e−00 | A = 0 | B = 2.54126e−04 |
| | C = 2.06088e−06 | D = −2.24736e−08 | E = 1.58114e−10 |
| R11: | k = 0.00000e+00 | A = 0 | B = 7.20047e−04 |
| | C = −4.16218e−05 | D = 9.59400e−06 | E = −6.33877e−07 |

Numerical Example 12:

f = 6.05~17.89   Fno = 2.85~4.89   2ω = 55.8° ~20.3°

| | | | |
|---|---|---|---|
| *R 1 = −72.419 | D 1 = 1.30 | N 1 = 1.728740 | ν 1 = 49.2 |
| R 2 = 5.888 | D 2 = 0.93 | | |
| R 3 = 7.198 | D 3 = 1.80 | N 2 = 1.848030 | ν 2 = 24.1 |
| R 4 = 13.000 | D 4 = Variable | | |
| R 5 = 6.267 | D 5 = 2.20 | N 3 = 1.685748 | ν 3 = 56.0 |
| R 6 = −43.246 | D 6 = 0.80 | | |
| R 7 = Stop | D 7 = 1.20 | | |
| R 8 = −7.776 | D 8 = 1.50 | N 4 = 1.846659 | ν 4 = 23.8 |
| R 9 = 65.507 | D 9 = Variable | | |
| R10 = 8.656 | D10 = 2.00 | N 5 = 1.583126 | ν 5 = 59.4 |
| *R11 = −23.048 | D11 = Variable | | |
| R12 = 25.700 | D12 = 1.50 | N 6 = 1.847000 | ν 6 = 23.8 |
| R13 = ∞ | D13 = 0.20 | | |
| R14 = ∞ | D14 = 3.00 | N 7 = 1.516330 | ν 7 = 64.2 |
| R15 = ∞ | | | |

| Variable | Focal Length | | |
|---|---|---|---|
| Separation | 6.05 | 11.50 | 17.89 |
| D 4 | 13.77 | 4.34 | 0.80 |
| D 9 | 1.86 | 1.13 | 0.80 |
| D11 | 5.44 | 10.59 | 16.47 |

Aspheric Coefficients:

| | | | |
|---|---|---|---|
| R 1: | k = 0.00000e+00 | A = 0 | B = 1.63030e−04 |
| | C = 2.55415e−06 | D = −5.31262e−08 | E = 7.90668e−10 |
| R11: | k = 0.00000e+00 | A = 0 | B = 1.38834e−03 |
| | C = −7.79295e−05 | D = 3.03118e−05 | E = −2.98980e−06 |

TABLE 3

| | Numerical Example | | | | |
|---|---|---|---|---|---|
| | 8 | 9 | 10 | 11 | 12 |
| (7) R2$_{n1}$/fW | −1.08 | −1.00 | −1.02 | −1.12 | −1.28 |
| (3) D12W−D12T D23W−D23T | 6.35 | 4.66 | 5.35 | 12.39 | 12.24 |

It will be appreciated from the foregoing that, according to the third embodiment disclosed as applied to the negative lead type of zoom lens, with inclusion of at Yeast three lens units, the form and the construction and arrangement of the constituent lenses in each of the lens units are appropriately determined to shorten the total length of the entire lens system. It is, therefore, made possible to achieve a compact zoom lens whose range is 3 of thereabout and which includes wide-angles of field at a maximum of 65°–70°, while still permitting a high optical performance to be maintained stable over the entire zooming range.

What is claimed is:

1. A zoom lens comprising, in order from an object side to an image side:

a first lens unit of negative refractive power;

a second lens unit of positive refractive power;

a third lens unit of negative refractive power, said third lens unit consisting of one negative lens; and a fourth lens unit of positive refractive power, said fourth lens unit consisting of one positive lens, wherein, during zooming from a wide-angle end to a telephoto end, all the lens units move along an optical axis in such a manner that a separation between said first lens unit and said second lens unit decreases, a separation between said second lens unit and said third lens unit increases and a separation between said third lens unit and said fourth lens unit decreases.

2. A zoom lens according to claim 1, wherein said first lens unit includes a negative lens, a positive lens and an aspherical lens.

3. A zoom lens according to claim 1, further comprising an aperture stop disposed in between said second lens unit and said third lens unit.

4. A zoom lens according to claim 3, wherein the positive lens in said fourth lens unit: has an aspheric surface, said zoom lens satisfying the following condition:

$$1 < DA4/fW < 3$$

where DA4 is a distance from said aperture stop to said aspheric surface, and fW is a focal length in the wide-angle end of said zoom lens.

5. A zoom lens according to claim 1, wherein said first lens unit moves in a locus convex toward the image side during zooming from the wide-angle end to the telephoto end.

6. A zoom lens according to claim 1, wherein, during zooming, said second lens unit and said fourth lens unit move in unison.

7. A zoom lens according to claim 1, satisfying the following condition:

$$2 < (D12W - D12T)/(D34W - D34T) < 5$$

where D12W and D12T are separations in the wide-angle end and the telephoto end between said first lens unit and said second lens unit, respectively, and D34W and D34T are separations in the wide-angle end and the telephoto end between said third lens unit and said fourth lens unit, respectively.

8. A zoom lens according to claim 1, satisfying the following condition:

$$1.5 < D34W/D34T < 8.0$$

where D34W and D34T are separations in the wide-angle end and the telephoto end between said third lens unit and said fourth lens unit, respectively.

9. A zoom lens comprising, in order from an object side to an image side:

a first lens unit of negative refractive power, said first lens unit including a negative lens, a positive lens and an aspherical lens;

a second lens unit of positive refractive power;

a third lens unit of negative refractive power, said third lens unit consisting of one negative lens; and a fourth lens unit of positive refractive power, wherein, during zooming from a wide-angle end to a telephoto end, every adjacent two of the lens units move along an optical axis while varying a separation therebetween.

10. A zoom lens according to claim 9, wherein said second lens unit includes no negative lens.

11. A zoom lens according to claim 9, further comprising an aperture stop disposed in between said second lens unit and said third lens unit.

12. A zoom lens according to claim 11, wherein said fourth lens unit consists of one aspherical positive lens, said zoom lens satisfying the following condition:

$$1 < DA4/fW < 3$$

where DA4 is a distance from said aperture stop to an aspheric surface of said aspherical positive lens, and fW is a focal length in the wide-angle end of said zoom lens.

13. A zoom lens according to claim 9, wherein said first lens unit moves in a locus convex toward the image side during zooming from the wide-angle end to the telephoto end.

14. A zoom lens according to claim 9, wherein, during zooming, said second lens unit and said fourth lens unit move in unison.

15. A zoom lens according to claim 9, satisfying the following condition:

$$2 < (D12W - D12T)/(D34W - D34T)$$

where D12W and D12T are separations in the wide-angle end and the telephoto end between said first lens unit and said second lens unit, respectively, and D34W and D34T are separations in the wide-angle end and the telephoto end between said third lens unit and said fourth lens unit, respectively.

16. A zoom lens according to claim 9, satisfying the following condition:

$$1.5 < D34W/D34T < 8.0$$

where D34W and D34T are separations in the wide-angle end and the telephoto end between said third lens unit and said fourth lens unit, respectively.

17. A zoom lens comprising, in order from an object side to an image side:

a first lens unit of negative refractive power;

a second lens unit of positive refractive power;

a third lens unit of negative refractive power; and a fourth lens unit of positive refractive power, said fourth lens unit consisting of one aspherical positive lens, wherein, during zooming from a wide-angle end to a telephoto end, every adjacent two of the lens units move along an optical axis while varying a separation therebetween.

18. A zoom lens according to claim 17, wherein said first lens unit includes an aspherical lens.

19. A zoom lens according to claim 17, wherein said first lens unit includes a negative lens and a positive lens.

20. A zoom lens according to claim 17, wherein, during zooming from the wide-angle end to the telephoto end, all the lens units move along the optical axis in such a manner that a separation between said first lens unit and said second lens unit decreases, a separation between said second lens unit and said third lens unit increases and a separation between said third lens unit and said fourth lens unit decreases.

21. A zoom lens according to claim 17, wherein a lens surface on the object side of said fourth lens unit is an aspheric surface.

22. A zoom lens according to claim 17, further comprising an aperture stop disposed in between said second lens unit and said third lens unit.

23. A zoom lens according to claim 22, satisfying the following condition:

$$1 < DA4/fW < 3$$

where DA4 is a distance from said aperture stop to an aspheric surface of said aspherical positive lens, and fW is a focal length in the wide-angle end of said zoom lens.

24. A zoom lens according to claim 17, wherein said first lens unit moves in a locus convex toward the image side during zooming from the wide-angle end to the telephoto end.

25. A zoom lens according to claim 17, wherein, during zooming, said second lens unit and said fourth lens unit move in unison.

26. A zoom lens according to claim 17, satisfying the following condition:

$$2 < (D12W - D12T)/(D34W - D34T) < 5$$

where D12W and D12T are separations in the wide-angle end and the telephoto end between said first lens unit and said second lens unit, respectively, and D34W and D34T are separations in the wide-angle end and the telephoto end between said third lens unit and said fourth lens unit, respectively.

27. A zoom lens according to claim 17, satisfying the following condition:

$$1.5 < D34W/D34T < 8.0$$

where D34W and D34T are separations in the wide-angle end and the telephoto end between said third lens unit and said fourth lens unit, respectively.

28. A zoom lens comprising, in order from an object side to an image side:

a first lens unit of negative refractive power, said first lens unit including a negative lens, a positive lens and an aspherical lens;

a second lens unit of positive refractive power;

an aperture stop;

a third lens unit of negative refractive power, said third lens unit consisting of one negative lens; and a fourth lens unit of positive refractive power, wherein, during zooming from a wide-angle end to a telephoto end, every adjacent two of the lens units move along an optical axis while varying a separation therebetween.

29. A zoom lens according to claim 28, wherein, during zooming from the wide-angle end to the telephoto end, all the lens units move along the optical axis in such a manner that a separation between said first lens unit and said second lens unit decreases, a separation between said second lens unit and said third lens unit increases and a separation between said third lens unit and said fourth lens unit decreases.

30. A zoom lens according to claim 28, wherein said fourth lens unit consists of one aspherical positive lens, said zoom lens satisfying the following condition:

$$1 < DA4/fW < 3$$

where DA4 is a distance from said aperture stop to an aspheric surface of said aspherical positive lens, and fW is a focal length in the wide-angle end of said zoom lens.

31. A zoom lens according to claim 28, wherein said first lens unit moves in a locus convex toward the image side during zooming from the wide-angle end to the telephoto end.

32. A zoom lens according to claim 28, wherein, during zooming, said second lens unit and said fourth lens unit move in unison.

33. A zoom lens according to claim 28, satisfying the following condition:

$$2 < (D12W - D12T)/(D34W - D34T) < 5$$

where D12W and D12T are separations in the wide-angle end and the telephoto end between said first lens unit and said second lens unit, respectively, and D34W and D34T are separations in the wide-angle end and the telephoto end between said third lens unit and said fourth lens unit, respectively.

34. A zoom lens according to claim 28, satisfying the following condition:

$$1.5 < D34W/D34T < 8.0$$

where D34W and D34T are separations in the wide-angle end and the telephoto end between said third lens unit and said fourth lens unit, respectively.

35. An optical apparatus comprising:

a zoom lens according to one of claims 1 to 34.

* * * * *

UNITED STATES PATENT AND TRADEMARK OFFICE
CERTIFICATE OF CORRECTION

PATENT NO. : 6,233,099 B1
DATED : May 15, 2001
INVENTOR(S) : Yoshinori Itoh

It is certified that error appears in the above-identified patent and that said Letters Patent is hereby corrected as shown below:

Title page,
Item [56], References Cited, "5,585,971 12/1996 Otoh" should read
-- 5,585,971 12/1996 Itoh --.
"53-13066" should read -- 5-313066 --.

Item [62], Related U.S. Application Data, "Sept. 10" should read -- Sep. 1 --.

Column 1,
Line 5, "Sep. 10" should read -- Sep. 1 --.

Column 3,
Line 32, "Theses" should read -- These --.

Column 6,
Line 32, "block:" should read -- block --.

Column 7,
Line 35, "hi-convex" should read -- bi-convex --.
Line 44, "hi-convex" should read -- bi-convex --.

Column 9,
Line 22, "vi" should read -- vi --.

Column 11,
Line 40, "D12W-D12T                    -- D12W-D12T
         D34W-D34T" should read      D34W-D34T --.
Line 50, "assure" should read -- assures --.

Column 13,
Line 51, "dew" should read -- diw --.

Column 15,
Line 7, "4.3&" should read -- 4.30 --.
Line 66, "Lo" should read -- to --.

Column 19,
Line 11, "2.5O" should read -- 2.50 --.

UNITED STATES PATENT AND TRADEMARK OFFICE
CERTIFICATE OF CORRECTION

PATENT NO.    : 6,233,099 B1
DATED         : May 15, 2001
INVENTOR(S)   : Yoshinori Itoh It is certified that error appears in the above-identified patent and that said Letters Patent is hereby corrected as shown below:

Column 20,
Line 18, "R2=5.888" should read -- R2=5.808 --.
Line 50, "D12W-D12T                -- D12W-D12T
         D23W-D23T" should read    D23W-D23T --.
Line 55, "Yeast" should read -- least --.

Column 21,
Line 20, "unit:" should read -- unit --.

Column 22,
Line 28, "D34T)" should read -- D34T)<5 --.

Signed and Sealed this

Nineteenth Day of November, 2002

Attest:

JAMES E. ROGAN
Attesting Officer            Director of the United States Patent and Trademark Office